(12) United States Patent
Luo

(10) Patent No.: US 12,402,206 B2
(45) Date of Patent: Aug. 26, 2025

(54) SYSTEM AND METHODS OF MOBILE AND PLUG-AND-PLAY CELL NETWORKS

(71) Applicant: Minsky Luo, Watchung, NJ (US)

(72) Inventor: Minsky Luo, Watchung, NJ (US)

(*) Notice: Subject to any disclaimer, the term of this patent is extended or adjusted under 35 U.S.C. 154(b) by 267 days.

(21) Appl. No.: 17/699,511

(22) Filed: Mar. 21, 2022

(65) Prior Publication Data

US 2023/0056096 A1   Feb. 23, 2023

Related U.S. Application Data

(60) Provisional application No. 63/230,812, filed on Aug. 8, 2021.

(51) Int. Cl.
| | | |
|---|---|---|
| *H04W 84/00* | (2009.01) | |
| *H04W 48/04* | (2009.01) | |
| *H04W 88/04* | (2009.01) | |
| *H04W 88/08* | (2009.01) | |

(52) U.S. Cl.
CPC ......... *H04W 84/005* (2013.01); *H04W 48/04* (2013.01); *H04W 88/04* (2013.01); *H04W 88/08* (2013.01)

(58) Field of Classification Search
CPC ... H04W 48/02; H04W 48/04; H04W 84/005; H04W 88/04; H04W 88/08
See application file for complete search history.

(56) References Cited

U.S. PATENT DOCUMENTS

| | | | |
|---|---|---|---|
| 9,049,927 B2 | 6/2015 | Teyeb et al. | |
| 9,078,286 B1 | 7/2015 | Yuan et al. | |
| 9,369,931 B2 | 6/2016 | Norman et al. | |
| 9,629,040 B2 | 4/2017 | Bao et al. | |
| 9,877,247 B2 | 1/2018 | Hunukumbure et al. | |
| 9,913,095 B2 | 3/2018 | Talluri et al. | |
| 9,924,439 B2 | 3/2018 | Giloh | |
| 10,097,958 B2 | 10/2018 | Talluri et al. | |
| 10,206,232 B2 | 2/2019 | Novlan et al. | |
| 10,285,094 B2 | 5/2019 | Cummings | |
| 10,349,218 B2 | 7/2019 | Talluri et al. | |
| 10,396,925 B2 | 8/2019 | Wu et al. | |
| 10,405,260 B2 | 9/2019 | Zavesky et al. | |
| 10,440,761 B2 | 10/2019 | Laraqui et al. | |
| 10,524,180 B2 | 12/2019 | Hahn et al. | |
| 10,555,054 B2 | 2/2020 | Byers et al. | |

(Continued)

FOREIGN PATENT DOCUMENTS

WO   2017/172789 A1   10/2017

*Primary Examiner* — Pao Sinkantarakorn
(74) *Attorney, Agent, or Firm* — BACON & THOMAS, PLLC

(57) ABSTRACT

A mobile cell (mCell) for use in a wireless communication system is disclosed. The mCell may include a wireless network cell node attached to a mobile carrier. The mCell may have one or more processors operable to: assign physical cell identity (PCI) and root sequence index (RSI) for allowing the mCell to join the network in a plug-and-play manner and to maintain connectivity with the system while moving; provide wireless application access for user equipment (UE) and wireless data relay and xHaul for neighboring cells nodes while the mCell is moving; and communicatively couple with other cells and network elements of the system, thereby forming a mesh network for extending and enhancing wireless communication within the system.

19 Claims, 12 Drawing Sheets

(56) References Cited

U.S. PATENT DOCUMENTS

| | | | |
|---|---|---|---|
| 10,820,150 B2 | 10/2020 | Talluri et al. | |
| 10,834,608 B1* | 11/2020 | Yuan | H04W 16/18 |
| 2012/0003962 A1 | 1/2012 | Jeon et al. | |
| 2014/0233412 A1 | 8/2014 | Mishra et al. | |
| 2015/0031372 A1 | 1/2015 | Foerster et al. | |
| 2015/0181502 A1 | 6/2015 | Hans et al. | |
| 2015/0312824 A1 | 10/2015 | Thalanany et al. | |
| 2016/0088585 A1* | 3/2016 | Garg | H04W 64/003 455/552.1 |
| 2016/0363457 A1 | 12/2016 | Jelavic et al. | |
| 2017/0026891 A1 | 1/2017 | Hahn et al. | |
| 2017/0208508 A1 | 7/2017 | Laraqui et al. | |
| 2017/0280417 A1* | 9/2017 | Nenner | H04W 68/00 |
| 2018/0199158 A1 | 7/2018 | Talluri et al. | |
| 2018/0287727 A1 | 10/2018 | Wu et al. | |
| 2019/0037466 A1 | 1/2019 | Saiwai et al. | |
| 2019/0208400 A1* | 7/2019 | Suzuki | H04W 8/08 |
| 2019/0223002 A1 | 7/2019 | Novlan et al. | |
| 2019/0387455 A1 | 12/2019 | Zavesky et al. | |
| 2021/0058854 A1* | 2/2021 | Luo | H04W 84/005 |
| 2021/0314908 A1* | 10/2021 | Gonzalez Escudero | G01S 1/0423 |
| 2021/0321281 A1* | 10/2021 | Wei | H04B 17/336 |
| 2022/0295308 A1* | 9/2022 | Dang | H04W 48/08 |
| 2023/0247504 A1* | 8/2023 | Haustein | H04W 36/08 455/436 |

* cited by examiner

600

| Service Slice | Interface Peer | Cell Module | Interface Protocol |
|---|---|---|---|
| Application Access | UE(s) | RU/DU | Uu |
| xHaul, Relay | RU/MT of child node(s) | RU/DU | simplified Uu with tunnels for payload data protocols, e.g. F1, RLC, GTP, etc. |
| | RU/DU of parent node(s) | RU/MT | |
| SON, Handover | RU/DU of sibling node(s) | RU/DU | Xn (Xn-C, Xn-U) |

| Function Plane | RF Band | Bandwidth | Transport Multiplex | UL/DL Duplex | Routing Topology |
|---|---|---|---|---|---|
| Control Plane | Sub-6 | 10 MHz x N | TDM/FDM | FDD | Single-hop Star |
| Management Plane | | | | | |
| User Plane | mmWave | 100 MHz x N | TDM/FDM | TDD | Multi-hop Acyclic Directed Graph |
| Signal | | | | | |

SYSTEM AND METHODS OF MOBILE AND PLUG-AND-PLAY CELL NETWORKS

RELATED APPLICATION

This application claims priority to U.S. Provisional Patent Application Ser. No. 63/230,812, filed on Aug. 8, 2021, the disclosure of which is hereby incorporated by reference in its entirety.

TECHNICAL FIELD

Embodiments of the present disclosure relate generally to systems and methods of mobile and plug-and-play cell networks for wireless communication services. More particularly, embodiments relate to Radio Access Network (RAN) infrastructure and small cell densification for high quality wireless communications of 5th generation (5G), 6th generation (6G), and other next generation (NG) networks.

BACKGROUND

With the popularization of smartphones, mobile computing devices, tablets, Internet of Things (IoT) devices, and Industrial IoT (IIoT) devices, data and mobile communications traffic has been steadily on the rise along with the need for fast and high-quality (massive connectivity, high capacity, ultra-reliability and low latency) wireless communication services. In order to provide the faster speed and higher quality wireless communication services, 5G and next-generation technologies typically must use high frequency bands, such as millimeter wave (mm Wave), or the like, and small cells to enhance the bandwidth and speed of the network. Use of these high frequency bands can deliver increased capacity, high throughput, and low latency. Due to the limited effective radio range of the high frequency spectrum, however, these small cells offer a much smaller coverage area than a macro cell, for example. As such, cell densification on a large scale is required to provide extensive service coverage. In the U.S., for example, operators may need to deploy 5 to 10 times more small cells than macro cells in given area to provide adequate cell densification for 5G, 6G, or other next generation network services.

Many types of wireless network cells, including small cells and macro cells, are installed on fixed physical structures, such as towers, light poles, or other buildings. These cells are stationary and have system parameters such as physical cell identity (PCI) and root sequence index (RSI) preassigned or remotely configured by a central controller or network planner. There are drawbacks and limitations to these systems, however. One of the major drawbacks is the costs of site preparation, cell installation, operation, and maintenance.

The costs associated with rolling out a large number of stationary cells are significant. In addition to the costs of constructing the towers, poles, or anchoring structures, these stationary sites also require leasing or purchasing real estate and the legal right of way for site access and cable installation. Providing power to the cell sites, including fixed power lines and backup batteries, or the like, may also be costly. There is also a significant cost associated with servicing and maintaining these cell sites on site in the field or on the street. The potential for weather damage including threats of erosion, storms, or natural disasters are some additional issues hindering the progress of cell densification.

There are also political challenges to installing stationary cell sites in or near populated areas. These stationary cells may be considered aesthetically conspicuous or unappealing to many local communities. The proposed installation of stationary cells is often greeted by political and/or civil resistance.

SUMMARY

Disclosed herein is a mobile cell (mCell) for use in a wireless communication system, the mCell comprising a mobile carrier operable to transport a cell node; a cell node carried by the mobile carrier, the cell node having one or more processors operable to automatically adjust system parameters for allowing the mCell to maintain wireless connectivity with the system while the mCell is moving and while the mCell is stationary; provide wireless communication service to a user equipment (UE) while the mCell is moving and while the mCell is stationary; and communicatively connect with other mCells and stationary cells, thereby forming a mesh network for wireless communication and enabling plug-and-play connectivity while the mCell is moving and while the mCell is stationary.

Further disclosed herein is a method of wireless communication within a plug-and-play network, the method comprising providing a mobile cell (mCell) for use in a wireless communication system, the mCell comprising a mobile carrier operable to transport a cell node; and a cell node carried by the mobile carrier; automatically adjusting, by the mCell, system parameters, the system parameters comprising at least a physical cell identity (PCI) and root sequence index (RSI) for allowing the mCell to maintain wireless connectivity with the system while the mCell is moving and while the mCell is stationary; providing, by the mCell, wireless communication service to a user equipment (UE) while the mCell is moving and while the mCell is stationary; communicatively connecting the mCell to other mCells and stationary cells, thereby forming a mesh network for wireless communication and enabling plug-and-play connectivity; and wherein when the mCell moves, the PCI and the RSI is automatically updated according to a mapping algorithm of new location coordinates.

Also disclosed herein is a system of wireless communication, the system comprising a mobile cell (mCell) comprising a mobile carrier operable to transport a cell node; a cell node carried by the mobile carrier, the cell node having one or more processors operable to: automatically and dynamically assign system parameters, the system parameters comprising at least a physical cell identity (PCI) and root sequence index (RSI) for allowing the mCell to maintain wireless connectivity with the system while the mCell is moving and while the mCell is stationary; provide wireless communication service to a user equipment (UE) while moving and while stationary; and communicatively connect with other mCells and stationary cells, thereby forming a mesh network for wireless communication and enabling plug-and-play connectivity; a UE operable to communicatively connect to the mCell; wherein the PCI and the RSI of the mCell is automatically updated according to a mapping algorithm of location coordinates if the mCell moves; and wherein the mobile carrier comprises at least one of a land transportation vehicle, a watercraft, and an aircraft.

This Summary is neither intended nor should it be construed as being representative of the full extent and scope of the present disclosure. The present disclosure is set forth in various levels of detail in the Summary as well as in the attached drawings and the Detailed Description, and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below.

BRIEF DESCRIPTION OF THE FIGURES

The accompanying figures, which are incorporated in and constitute a part of the specification, illustrate embodiments of the present disclosure and, together with the description, serve to explain the objects, advantages, and principles of the disclosure. Embodiments of the disclosure are in no way limited by the following figures:

FIG. 6 is a table illustrating interface protocols used by an exemplary mCell for wireless application access and wireless xHaul services in accordance with embodiments of the present disclosure;

FIG. 7 is a physical cell identity (PCI) mapping diagram illustrating an exemplary method of assigning optimal PCI efficiently, based on geo-coordinates of the cell node, according to some embodiments of the present disclosure;

FIG. 11 is a table illustrating Control/User Planes Separation (CUPS) of an exemplary cell mesh;

DETAILED DESCRIPTION

Figure 1:
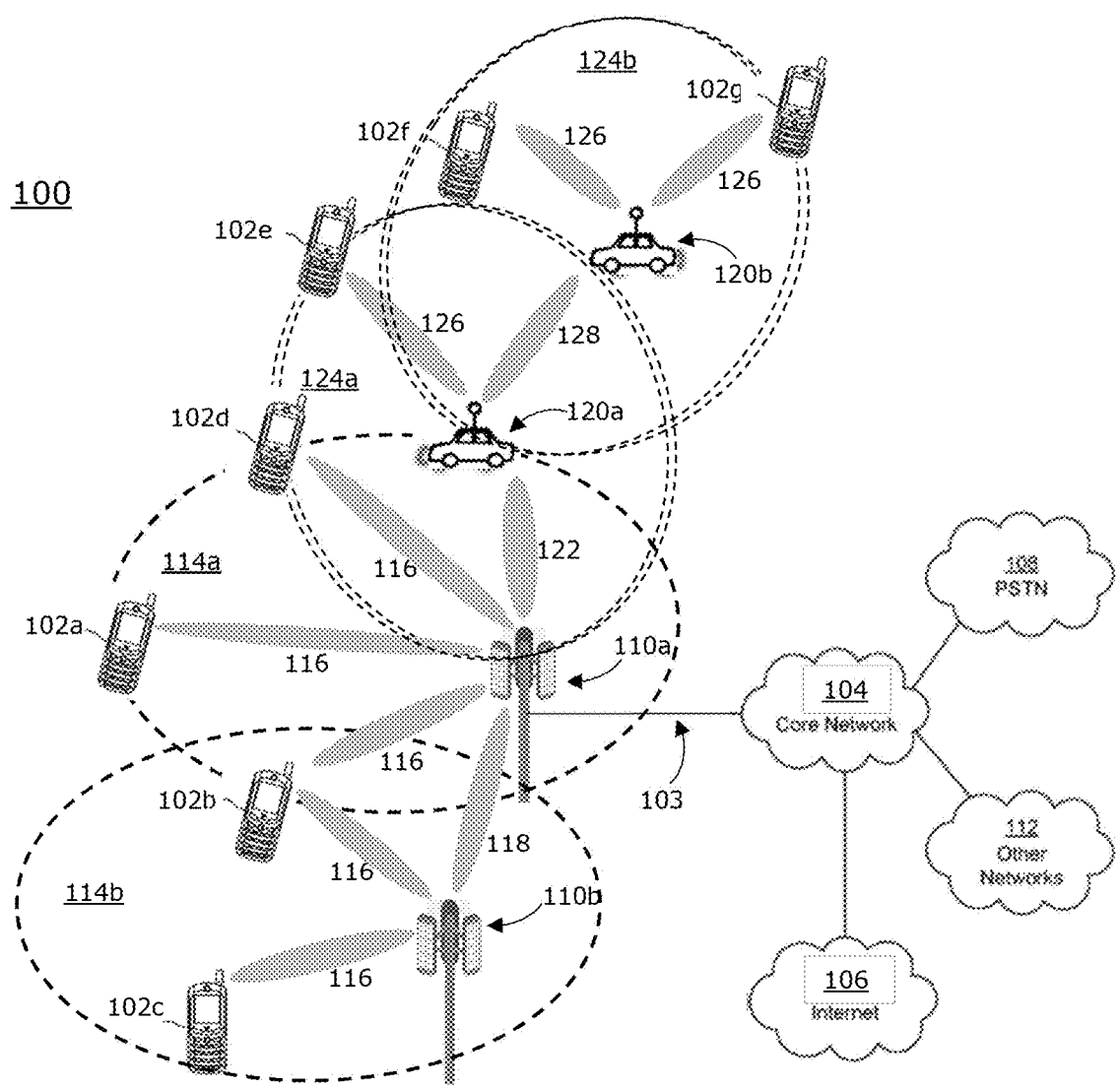
FIG. 1 is a system diagram of a communications system with stationary cells and mobile cells in accordance with embodiments of the present disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

As used herein, the term "infer" or "inference" refers generally to the process of reasoning about, or inferring states of, the system, environment, user, and/or intent from a set of observations as captured via events and/or data.

Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As utilized herein, herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

As used herein, a User Equipment (UE) may refer to any type of device configured to operate and/or communicate in a wireless network. A UE may be referred to as a wireless transmit/receive unit (WTRU) and configured to transmit and/or receive wireless signals and communicatively connect with radio network nodes in a cellular or mobile communication system. Examples of UE are cellular telephone, smartphone, PDA, tablet, personal computer, wireless sensor, hotspot or Wi-Fi device, Internet of Things (IoT) device, watch or other wearable, head-mounted display (HMD), target device, device to device (D2D) UE, machine type UE or UE capable of machine to machine (M2M) communication, laptop embedded equipped (LEE), laptop mounted equipment (LME), USB dongles, mobile station, fixed or mobile terminal, subscriber unit, connected vehicle, drone, space rocket, robot, medical device and applications (e.g., remote surgery), industrial device and applications (e.g., a robot and/or other wireless devices operating in an industrial and/or an automated processing chain contexts), consumer electronics device, device operating on commercial and/or industrial wireless networks, and/or the like. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

As used herein, a Cell or a Cell Node may be a network node that communicatively connects UE(s) and neighboring network nodes and network elements and serves UE to access applications and services, including the Internet and cloud services, over the network. A Cell or a Cell node may be referred to as radio network node, cellular network node, wireless access point (WAP), relay transmission point (rTP), donor cell node, remote radio unit (RRU), remote radio head (RRH), base station (BS), base transceiver station (BTS), NodeB/eNodeB/gNodeB, multi-standard radio (MSR) node such as MSR BS, network controller, radio network controller (RNC), base station controller (BSC), nodes in distributed antenna system (DAS), and the like, depending on the Radio Access Technology (RAT) used for the network architecture and business practice of product providers, including 2G/3G/4G/5G/6G/NG, Open RAN, vRAN, and the like, used for the network architecture and business practice of product providers.

As used herein, the term processor, may be a general purpose processor, a special purpose processor, a conventional central processor (CPU), a graphic processor (GPU), a digital signal processor (DSP), a plurality of microprocessors, one or more microprocessors in association with a CPU, GPU, and/or DSP core, a controller, a microcontroller, Application Specific Integrated Circuits (ASICs), Field Programmable Gate Arrays (FPGAs) circuits, an integrated circuit (IC), a state machine, and/or the like. The processor may perform signal coding, data processing, computational algorithms, power control, input/output processing, and/or functionality that facilitates a network element to operate in a wireless environment. The processor may also couple with other peripheral devices to perform specific functions.

As used herein, "plug-and-play" may generally refer to networks that permit devices (e.g., UE, cell nodes) to seamlessly discover each other's presence on the network and establish functional network services. As used herein, the term "dynamically" may generally mean non-static and updated frequently, subject to delays in processing and transmission time, updated at specified intervals, or near-instantaneously.

A detailed description of illustrative embodiments will now be described with reference to the various figures. Although this description provides a detailed example of possible implementations, it should be noted that the details are intended to be examples and in no way limit the scope of the application. Embodiments of the present disclosure relate generally to systems and methods of mobile and plug-and-play cell networks for wireless communication services. More particularly, embodiments relate to radio access network (RAN) infrastructure and small cell densification for high quality wireless communications of 5th generation (5G), 6th generation (6G), next generations (NG), and other compatible networks.

In accordance with embodiments of the present disclosure, a wireless communication system may include mobile cell nodes (mCells) operable to travel and scale a network up or down substantially in real-time. The mCells may be cell nodes installed or mounted on/in mobile carriers or vehicles to provide UE access, wireless data relay/xHaul (including fronthaul, midhaul, sidehaul, and backhaul) and/or the like. The system may automatically and/or dynamically determine relay routes based on demand and network configuration. For example, in areas with a substantial number of UEs requiring wireless communication services in limited physical area, such as metropolitan area with high population density, a concert venue, sporting event, or the like, mCells may be dispatched in optimal locations to support the network on demand.

In accordance with exemplary embodiments, mCells may move and be positioned to join a wireless network randomly, on a schedule based on network patterns, dynamically and automatically in response to network conditions, or may be repositioned manually and/or the like to optimize a wireless communication system and improve service coverage and quality.

A mobile carrier may comprise a structure capable of transporting an mCell. By way of example, if the mobile carrier is a vehicle, the mCell may be mounted entirely or partially to the roof or an exterior surface of the vehicle, or the like. Alternatively, the mCell may also be installed entirely or partially inside the vehicle, such as in the trunk or in an inner compartment within the vehicle.

In some embodiments, mobile carriers in a wireless communication system may include a single classification such as automobiles. For example, a taxi fleet that may be used to house or transport an mCell to locations where the mCell is needed to provide cell densification for the network. In some embodiments, various types or classifications of mobile carriers may be used in the same network. For example, the same network may utilize various types of mobile carriers, such as automobiles, cars, bikes, motorcycles, land transportation vehicles, tractors, rickshaws, vans, mini-vans, busses, fanning equipment, trucks, horse carriages, sleds, spacecraft, tanks, dicycles, Segways®, Hoverboards®, shopping carts, baby transport, strollers, golf carts, snowmobiles, forklifts, riding mowers, automatic mowers, carts, skateboards, wagons, luggage, hovercraft, handcycles, tricycles, trains, airplanes, helicopters, drones, aircraft, jets, airships, rockets, gliders, autogyros, ornithopters, boats, watercraft, jet skis, construction vehicles, balloons, kites, subway trains, cable cars, trains, rapid transit, trolleys, streetcars, and/or the like.

Wireless communication systems in accordance with embodiments of the present disclosure may deploy a mesh network of mCells mixed with other cells in an integrated access and backhaul (IAB) network and other conventional stationary cells. To allow mCells to travel while providing service, embodiments of the present disclosure may require modification of the architecture, structure, and interface protocols of IAB network function stacks. In particular, to enable mobility of mCells, physical cell identity (PCI) assignment and IAB Relay Routing Topology (RRT) optimization may be updated dynamically, or the like. Embodiments of the present disclosure provide efficient automatic methods with algorithms to update self-organizing/optimizing network (SON) features dynamically and timely in accordance to the traveling velocity of mCells.

Embodiments of the present disclosure may comprise a mesh network, or the like, of mCells installed in or carried by mobile carriers or vehicles, or the like, and other conventional cells and devices that act as a single network and provide wireless communication connectivity in a physical area. To make small cell densification more cost-efficient, 3GPP Releases 15 and 16 introduced IAB, which allows a cell node to provide both wireless access for user devices and wireless backhaul connectivity, therefore eliminating the need for a wired landline backhaul. IAB leverages the spectral efficiencies of New Radio and the increased capacity afforded by the higher spectral bands available in 5G and later generations of wireless communication technology to deliver an alternative to wired backhaul. IAB allows for multi-hop xHaul using the same frequencies employed for user equipment (UE) access as well as a distinct, dedicated, frequency.

In some embodiments, an mCell may use IAB technology to remove the necessity of a physical cord. Standard IAB cells are not mobile. The mobility of a cell node creates additional challenges. For example, after moving or some displacement, the PCI of the cell may conflict with that of a new neighboring cell. PCI conflict, including collision or confusion, introduces radio interference and may defeat wireless connectivity and/or fail cell handover. While an IAB node is not mobile, an mCell is mobile and able to avoid PCI conflict by methods embodied by the present disclosure. An mCell may perform at least the same functionality as an IAB node, either stationary or traveling.

Embodiments of the present disclosure may include PCI/RSI assignment methods that are calculated efficiently to avoid PCI collision and confusion in new neighborhoods while moving or after traveling to a different location. The PCI/RSI assignment methods disclosed herein include solutions to enable a mobile cell mesh for wireless communication service in large scale. Mobile carriers or vehicles carrying mCells may move throughout an area while maintaining connection to the network and providing wireless communication service. Efficient PCI/RSI assignment makes high-speed, low latency, handover or handoff possible. In cellular telecommunications, handover, or handoff, is the process of transferring an ongoing call or data session from one serving cell to another for continuity of the session when the UE is about to be outside of the range of the serving cell. In accordance with embodiments of the present disclosure, a PCI assignment method may be autonomous, dynamically adjusted, or manually adjusted and may not rely on a central controller or manager, thereby enabling instant plug-and-play to join a network and to maintain connectivity with the network.

Embodiments of the present disclosure may convert cell densification rollout for 5G RAN into a mobile carrier or vehicle dispatch practice, or the like. Intelligent software and AI algorithms may be applied to optimize network performance and cost effectiveness and reduce energy consumption. Embodiments of the present disclosure provide a cost-effective solution that establishes and utilizes, instead of a grid of all stationary cell nodes anchored to the ground or other stationary fixture, a network of mobile cell nodes (mCells) and a smaller number of stationary donor cell nodes (dCells). A dCell can be a conventional cell node, typically stationary and connected to the edge network or core network via wired landline or specific microwave link. Cell nodes of some embodiments of the present disclosure are operable to provide wireless access on the frontend and a direct or indirect xHaul to the network edge on the backend, or the like.

FIG. 1 is a diagram illustrating an example communications system 100 in which one or more disclosed embodiments may be implemented. The communications system 100 includes a radio access network (RAN) and core network (CN) that provides content, such as voice, data, video, messaging, broadcast, etc., to multiple wireless service users.

As shown in FIG. 1, the communications system 100 may include stationary cell nodes 110a, 110b and mobile cell nodes (mCells) 120a, 120b that provide wireless service to UEs 102a, 102b, 102c, 102d, 102e, 102f, and/or 102g (which generally or collectively may be referred to as UE 102) over air interfaces 116, 126 in RAN coverage ranges 114a, 114b, 124a, and 124b respectively.

Cell node 110a is directly connected to a core network (CN) 104, the Internet 106, a public switched telephone network (PSTN) 108, and other networks 112. Cell node 110a is connected to CN 104 by transport fabric 103 with high bandwidth wire, optic fiber lines, coaxial cable, microwave stations, and the like. In this exemplary embodiment, cell node 110a is stationary while it is operational and providing service.

Cell node 110b is communicatively connected to a core network (CN) 104, the Internet 106, a public switched telephone network (PSTN) 108, and other networks 112 via wireless xHaul 118 relayed by cell node 110a. Wireless xHaul connection 118 is wireless relay using IAB technology or the like. Cell 110a may be a Donor Cell (dCell) node, also known as Anchor Cell (aCell), of the IAB network. Cell 110b may be an IAB Cell (iCell) node, also known as Relay Transmission Point (rTP) of the IAB network. In this exemplary embodiment, cell 110b, like cell 110a, is stationary while it is operational and providing service.

Cell node 120a is communicatively connected to a core network (CN) 104, the Internet 106, a public switched telephone network (PSTN) 108, and other networks 112 via wireless xHaul 122 relayed by cell 110a. Wireless xHaul connection 122 is a one-hop wireless relay using IAB technology, or the like. Cell 120a can be an IAB cell node and cell 110b may be a dCell of the IAB network. In this exemplary embodiment, cell 120a can be moving while it is operational and providing service.

Cell node 120b is communicatively connected to a core network (CN) 104, the Internet 106, a public switched telephone network (PSTN) 108, and other networks 112 via wireless xHaul 128 relayed by cell 120a and wireless xHaul 122 relayed by cell 110a. Wireless xHaul connection 122, 128 may be a two-hop wireless relay using IAB technology or the like. Cell 120b can be an IAB cell node and Cell 110a may be a dCell of the IAB network. In this exemplary embodiment, Cell 120b can be moving while it is operational and providing service.

It will be appreciated that the disclosed embodiments contemplate any number of UEs, stationary cell nodes, mobile cell nodes, networks, and/or other network elements suitable for use in the network system 100. Only one of each category of cell nodes and networks is shown in FIG. 1 for ease of illustration.

Each UE 102 may be any type of device configured to operate and/or communicate in a wireless network. By way of example, a UE may be referred to as a wireless transmit/receive unit (WTRU) or a station (STA), may be configured to transmit and/or receive wireless signals, and may include a mobile station, a fixed or mobile subscriber unit, a subscription-based unit, a cellular telephone, a smartphone, a laptop, a netbook, a personal computer, a wireless sensor, a hotspot or Wi-Fi device, an Internet of Things (IoT) device, a watch or other wearable, a head-mounted display (HMD), a vehicle, a drone, a robot, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and/or the like. A UE may be interchangeably referred to as a WTRU.

Each of the cell nodes 110a, 110b, 120a, and 120b may be network elements configured to wirelessly interface with one or more UEs 120 to facilitate wireless application access to one or more communication networks, such as CN 104, the Internet 106, PSTN 108, and/or other networks 112. By way of example, network nodes 110a, 110b, 120a, and 120b may be a base transceiver station (BTS), a NodeB, an eNodeB, a gNodeB, a NR NodeB, a macro cell, a small cell, a micro cell, a pico cell, a femto cell, a site controller, an access point (AP), a wireless router, and/or the like. While the network nodes 110a, 110b are each depicted as a single element, it will be appreciated that the network nodes 110a, 110b may include any number of interconnected base stations and/or network elements.

Air interfaces 116, 126 between cell Nodes 110a, 110b, 120a, 120b and UE 102, may be wireless communication links of suitable radio access technology (RAT), using one or more radio spectrum bands, such as radio frequency (RF), millimeter wave (mmWave), microwave, infrared (IR), ultraviolet (UV), visible light, etc.

In accordance with this exemplary embodiment of the present disclosure, cell nodes 120a, 120b can be moving as well as staying stationary while they are operational and providing wireless access service. Cell nodes 120a, 120b may be referred to as mobile cells (mCells). Cell nodes 110a, 110b have to stay stationary while they are operational and providing wireless application access service as most conventional cell nodes. Any difference between mCells and stationary cells, including donor cells (dCells), may be undetectable to UEs when communicating with the system 100. Both mCell nodes and stationary cell nodes, including donor cells (dCells) and IAM cells (iCells), or the like, use the same Uu interface standard to establish air interfaces 116 and 126. The Uu interface standard supports relative velocity between a UE and its serving cell node. Air interface 116, once established, allows UEs to move. Air interface 126, once established, allows both UE and cell node 120a/120b to move independently.

When an mCell 120a or 120b moves, its associated coverage range moves accordingly. If the serving cell of a UE, e.g. UE 102e, is an mCell, e.g. 120a which moves away so much that UE 102e is about to be outside of the coverage range 124a of cell 120a, (a condition detected by, e.g. radio signal strength diminishing across a threshold), the system performs a hand-over procedure to reconnect the UE to another cell node to maintain the connection for continued service. To maintain connection with the network, and support air interface with UE and neighboring cell nodes, the system of the disclosure may also perform a procedure to update configuration parameters of the mCell, such as PCI and RSI, to optimize its radio connectivity and communication capability with new neighboring cells and UEs.

Because an mCell can move to a location, configure system parameters, and serve the network instantly, it effectively extends service coverage from 114a and 114b by coverage 124a and 124b, in this exemplary embodiment. Dynamically dispatching mCells on demand extends coverage and provides a cost-effective solution for cell densification, especially small cell densification needed for 5G and next generations of high-speed ultra-wide-bandwidth wireless communication services.

Figure 2:
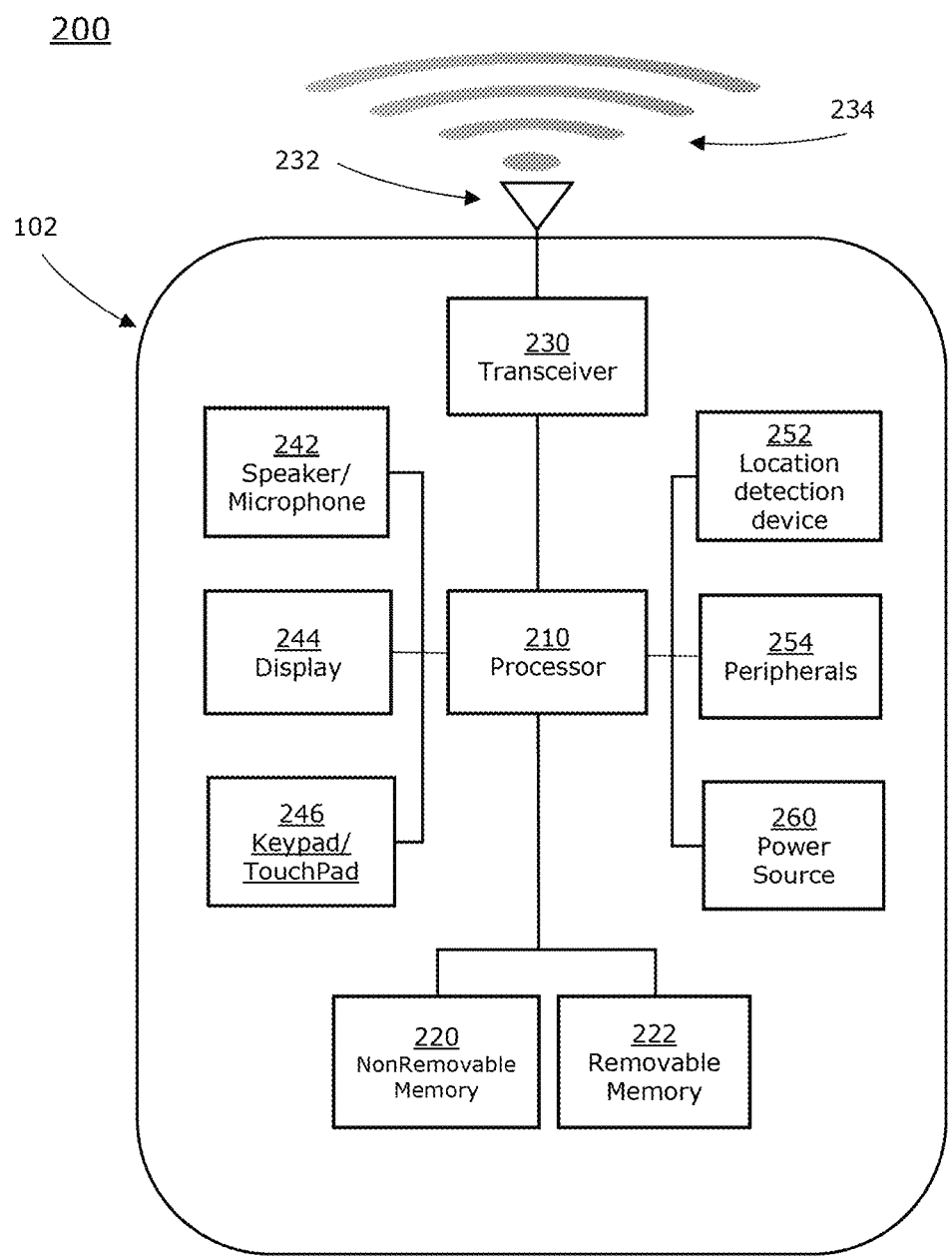
FIG. 2 is a schematic block diagram of the functional structure of an exemplary user equipment (UE) that may be used within the communications system illustrated in FIG. 1.

FIG. 2 is a schematic block diagram of the functional structure of an example user equipment (UE) that may be used within the communications system illustrated in FIG. 1. Each UE 102 may be a device configured to operate and/or communicate in a wireless network. By way of example, a UE may be referred to as a wireless transmit/receive unit (WTRU) or a station (STA), may be configured to transmit and/or receive wireless signals, and may include a mobile station, a fixed or mobile subscriber unit, a subscription-based unit, a cellular telephone, a smartphone, a laptop, a netbook, a personal computer, a wireless sensor, a hotspot or Wi-Fi device, an Internet of Things (IoT) device, a watch or other wearable, a head-mounted display (HMD), a vehicle, a drone, a robot, a medical device and applications (e.g., remote surgery), an industrial device (e.g., a robot and/or other wireless devices operating in an industrial and/or an automated processing chain context), a consumer electronics device, a device operating on commercial and/or industrial wireless networks, and/or the like.

A UE 102 may include one or more processors 210, non-removable memory 220, removable memory 222, a transceiver 230, a transmit/receive elements 232, a speaker/microphone 242, a display 244, a keypad/touchpad 246, a location detection device 252, peripherals 254, a power source 260, among others. It will be appreciated that the UE 102 may include none or multiple or any sub-combination of the foregoing elements while remaining consistent with an embodiment.

The processor 210, and the term processor as used herein, may be a general purpose processor, a special purpose processor, a conventional central processor (CPU), a graphic processor (GPU), a digital signal processor (DSP), a plurality of microprocessors, one or more microprocessors in association with a CPU, GPU, and/or DSP core, a controller, a microcontroller, Application Specific Integrated Circuits (ASICs), Field Programmable Gate Arrays (FPGAs) circuits, an integrated circuit (IC), a state machine, and/or the like. The processor 210 may perform signal coding, data processing, power control, input/output processing, and/or functionality that facilitates the UE 102 to operate in a wireless environment. The processor 210 may be coupled to the transceiver 230, which may be coupled to the transmit/receive element 232. While FIG. 2 depicts the processor 210 and the transceiver 230 as separate components, it will be appreciated that the processor 210 and the transceiver 230 may be integrated together in an electronic package or chip.

The transmit/receive element 230 may be configured to transmit signals to, or receive signals from, a cell node or other network element over the air interface 234, which may be an air interfaces 116 and 126, as depicted in FIG. 1, or the like. For example, in one embodiment, the transmit/receive element 232 may be an antenna configured to transmit and/or receive RF signals. In some embodiments, the transmit/receive element 232 may be an emitter/detector configured to transmit and/or receive, for example, IR, UV, or visible light signals, In yet another embodiment, the transmit/receive element 232 may be configured to transmit and/or receive both RF and light signals. It will be appreciated that the transmit/receive element 232 may be configured to transmit and/or receive a combination of wireless signals suitable for use within implementations of the present disclosure.

Although the transmit/receive element 232 is depicted in FIG. 2 as a single element, the UE 102 may include additional transmit/receive elements 232 suitable for use within implementations of the present disclosure. More specifically, the UE 102 may employ MIMO technology. Thus, in some embodiments, the UE 102 may include two or more transmit/receive elements 232 (e.g., multiple antennas) for transmitting and receiving wireless signals over the air interface 234.

The transceiver 230 may be configured to modulate the signals that are to be transmitted by the transmit/receive element 232 and to demodulate the signals that are received by the transmit/receive element 232. As noted above, the UE 102 may have multi-mode capabilities. Thus, the transceiver 230 may include multiple transceivers and antenna for facilitating the UE 102 to communicate via multiple RATs, such as LTE, 5G NR and IEEE 802.11, for example.

The processor 210 of the UE 102 may be coupled to, and may receive user input data from and output user data to, the speaker/microphone 242, the display 244, and/or keypad/touchpad 246. In addition, the processor 210 may access information from, and store data in, any type of suitable memory, such as the non-removable memory 220 and/or the removable memory 222. The non-removable memory 220 may include random-access memory (RAM), read-only memory (ROM), a hard disk, or a memory storage device suitable for implementations of the present disclosure. The removable memory 222 may include a subscriber identity module (SIM) card, a memory stick, a secure digital (SD) memory card, and/or the like. In other embodiments, the processor 210 may access information from, and store data in, memory that is not physically located on the UE 102, such as on a server or a home computer or server clusters of a network cloud.

The processor 210 may receive power from the power source 260 and may be configured to distribute and/or control the power to the other components in the UE 102. The power source 260 may be a suitable device for powering the UE 102. For example, the power source 260 may include one or more dry cell batteries (e.g., nickel-cadmium (NiCd), nickel-zinc (NiZn), nickel metal hydride (NiMH), lithium-ion (Li-ion), etc.), solid state batteries, solar cell batteries, fuel cell batteries, and the like.

The processor 210 may also be coupled to the location detection device 252, such as a GPS/GNSS receiver, which may be configured to provide location information (e.g., longitude and latitude) regarding the current location of the UE 102. In addition to, or in lieu of, the information from the location detection device 252, the UE 102 may receive location information over the air interface 234 from a cell node and/or determine its location based on the timing of the signals being received from two or more nearby cell nodes. It will be appreciated that the UE 102 may acquire location information by way of a suitable location-determination method consistent with embodiments of the present disclosure.

The processor 210 may further be coupled to other peripherals 254, which may include one or more software and/or hardware modules that provide additional features, functionality and/or wired or wireless connectivity. For example, the peripherals 254 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 254 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The UE 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor or via processor 210). In an embodiment, the UE 102 may include a half-duplex radio for which transmission and reception of some or all of the signals (e.g., associated with particular subframes for either the UL or the downlink).

Figure 3A:
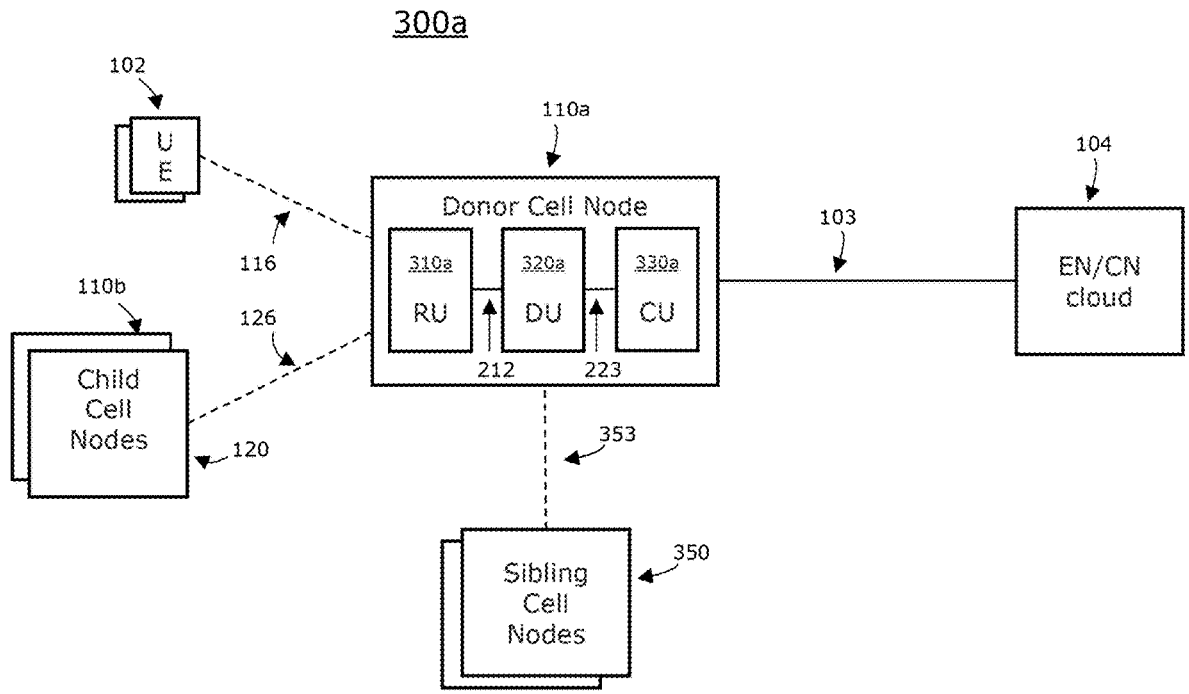
FIG. 3A is a block diagram of the structure and interfaces of an exemplary stationary donor cell that may be used within the communications system illustrated in FIG. 1.
Figure 3B:
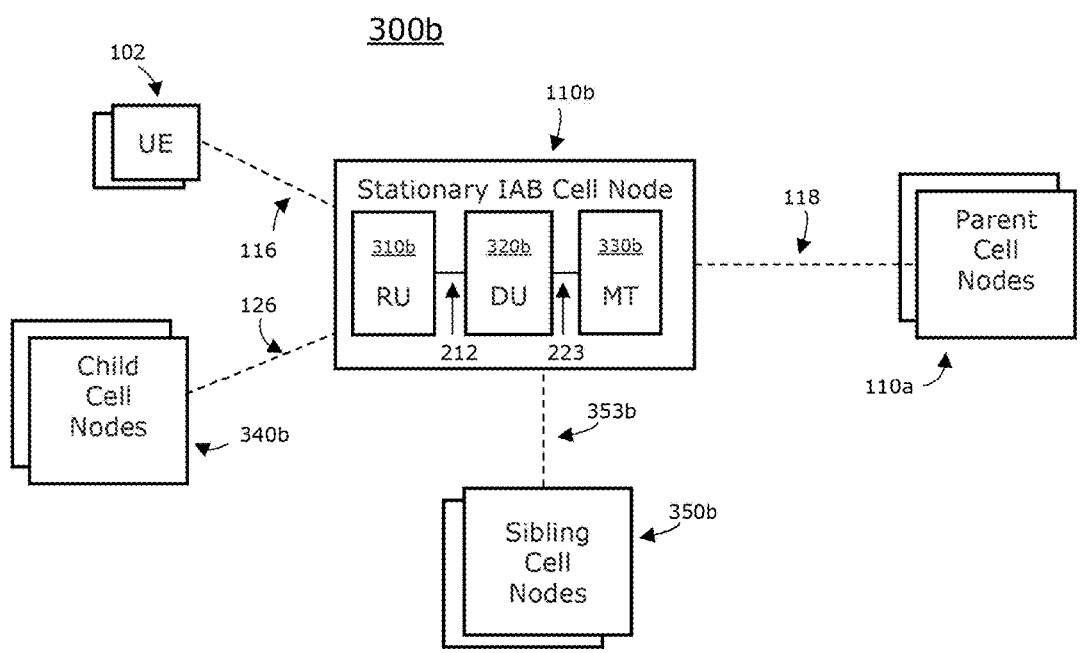
FIG. 3B is a block diagram of the structure and interfaces of an exemplary stationary IAB cell that may be used within the communications system illustrated in FIG. 1.

FIGS. 3A and 3B are block diagrams illustrating the logical structure and interfaces 300*a*, 300*b* of a stationary donor cell (dCell) node 110*a* and a stationary IAB cell (iCell) node 110*b*, respectively, in accordance with an exemplary implementations of the present disclosure. A dCell 110*a* may be a cell node comprising a remote radio unit (RU) 210, a distributed unit (DU) 320, and a centralized unit (CU) 330, or the like. An RU 310 may be operable to establish air interfaces with UE and/or cell nodes present in its coverage range. An RU 310 may be communicatively coupled with the DU 320 via an interface 312, or the like. In an exemplary embodiment, interface 312 may follow the F2 protocol of 5G NR and/or use common public radio interface (CPRI) or enhanced common public radio interface (eCPRI) protocol, or the like. An RU 310 may perform codec (coding and decoding) conversion between radio signal of air interfaces 116/126 and bit stream of digital interface 312.

A DU 320 may be operable to provide support for the lower layers of the RAN protocol stack, such as the radio link control (RLC) layer, the medium access control (MAC) layer, the physical layer, and/or the like. A DU 320*a* may be communicatively coupled with a CU 330 via an interface 323. A CU 330 may provide support for the higher layers of the RAN protocol stack such as the service data adaptation protocol (SDAP) layer, the packet data convergence protocol (PDCP) layer, the radio resource control (RRC) layer, or the like. A CU 330 may be backend connected to the edge network (EN) and/or the core network (CN) cloud 104 via a transport fabric 103, or the like.

In exemplary embodiments, the dCell 110*a* frontend may interface with one or more UEs 102 via interface 116 for wireless application access service and with its child nodes 110*b* and/or 120 via interface 126 for wireless xHaul data relay service, inter-cell communication, or the like. The dCell 110*a* may interface with one or more sibling cell nodes 350 via Xn-interface 353 for inter-cell communication or the like.

As illustrated in FIG. 3B, a DU 320*b* of iCell 110*b* may be communicatively coupled with a MT 330*b*. An MT 330*b* may wrap up data to be xHauled between DU 320*b* and the CU of the parent cell node and transmit/receive the data via tunnels established over the Uu interface 118. The wrapper may include encapsulated data the higher layers of the RAN protocol stack such as the service data adaptation protocol (SDAP) layer, the packet data convergence protocol (PDCP) layer, the radio resource control (RRC) layer, or the like. The DU 320*b* may provide wireless application access functions on the front end and the MT 330*b* may provide wireless relay functions in the backend, or the like, via wireless interface 118.

The iCell 110*b* frontend may interface with one or more UEs 102 via interface 116 for wireless application access service and with its child nodes 110*b* and/or 120 via interface 126 for wireless xHaul data relay service, inter-cell communication, or the like. The iCell 110*b* may interface with one or more sibling cell nodes 350*b* via Xn-interface 353*b* for inter-cell communication or the like. Because iCell 110*b* is stationary, its parent node may be assigned before it is operable and/or not very frequently.

Figure 4A:
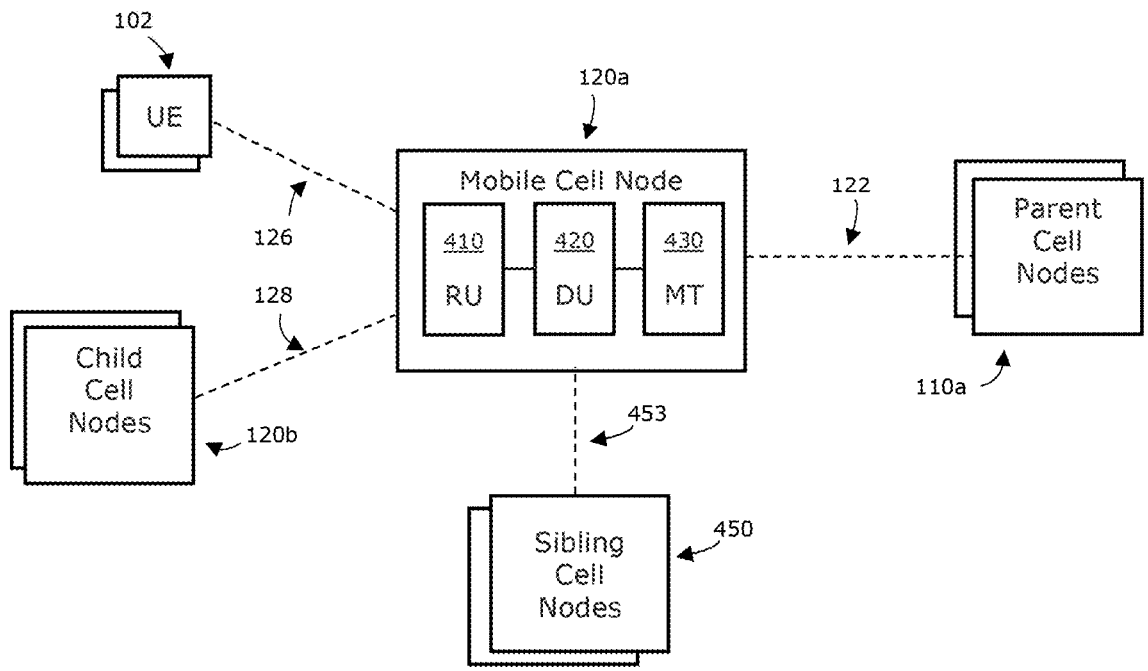
FIG. 4A is a block diagram of the structure and interfaces of an exemplary mCell that may be used within the communications system illustrated in FIG. 1.
Figure 4B:
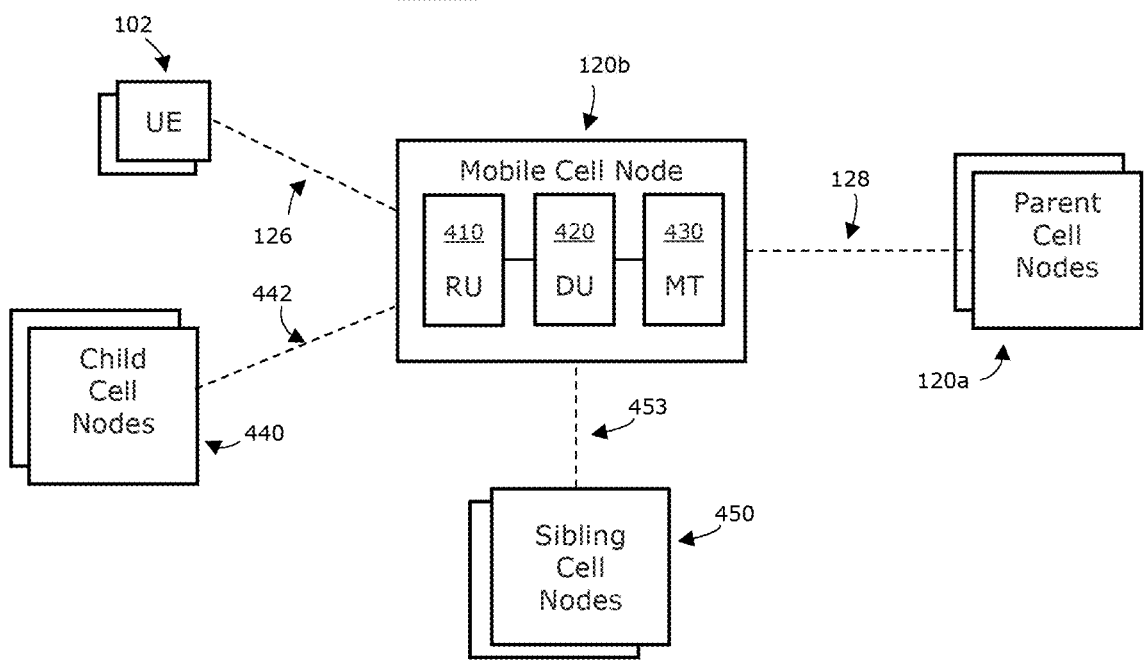
FIG. 4B is a block diagram of the structure and interfaces of an exemplary mCell that may be used within the communications system illustrated in FIG. 1.

FIGS. 4A and 4B are block diagrams of the structure and interfaces 400*a*, 400*b* of exemplary mCells 120*a*, 120*b* that may be used within the communications system 600 illustrated in FIG. 1. In some implementations, the mCell nodes 120*a* and 120*b* may be adapted for single relay hop and/or multiple relay hop communications, respectively.

An mCell 120*a*, 120*b* may comprise a remote radio unit (RU) 410, a distributed unit (DU) 420, and a mobile termination component (MT) 430 as well as internal interfaces for communicatively connecting the components. The DU 420 may provide wireless application access functions on the front end, or the like, via wireless interface 126. The MT 430 may provide wireless relay functions on the backend, or the like, via wireless interfaces 122 and 128. Those interfaces together with Xn-interface 453 with one or more sibling cell node(s) carries inter-cell communication for the network.

Because an mCell 120*a*, 120*b* may be moving, its parent node(s) may need to be re-assigned and its relay route topology (RRT) may need to be adjusted dynamically. A parent node may be a dCell, an iCell, and/or another mCell. If the parent node is a dCell, a single relay hop may be required. If the parent node is an iCell or another mCell, multiple hops may be required. In some implementations, the mCell nodes 120*a*, 120*b* may be adapted for both single hop and multiple hop relay. Parent nodes may be assigned/re-assigned to optimize the RRT for best xHaul and system performance.

In a system 400*a*, 400*b* in accordance with exemplary embodiments of the present disclosure, a plurality of UEs 102, child cell nodes 120*b*, 440, and parent cell nodes 110*a*, 120*a* may communicate and be communicatively connected simultaneously or substantially simultaneously. In some embodiments, one or more parent node(s) may be present per mCell node 120. Carrier aggregation practice may be implemented and may improve with the capability of multiple parent nodes, or the like. For example, carrier aggregation may be used in a system 400*a*, 400*b* in order to increase the bitrate, bandwidth, and throughput, thereby raise the speed and quality of the network and service.

Figure 5:
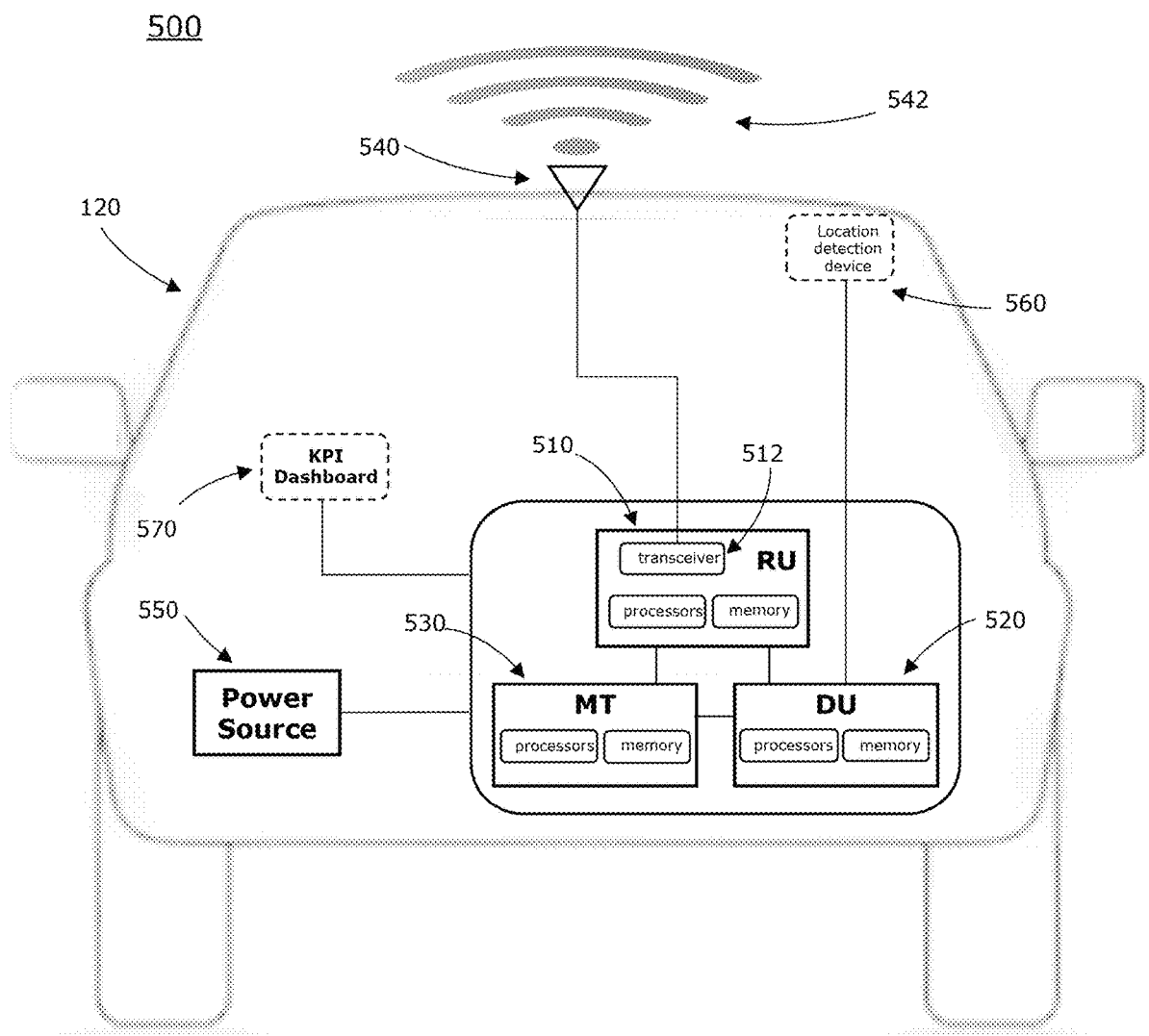
FIG. 5 is a schematic block diagram of the functional structure of an exemplary mCell that may be installed in a vehicle according to some embodiments of the present disclosure.

FIG. 5 is a schematic block diagram illustrating the physical structure of an mCell node in a system 500 according to some embodiments of the present disclosure. In an exemplary embodiment, a cell node or mCell 120 may comprise a remote unit (RU) 510, a distributed unit (DU) 520, and a mobile termination component (MT) 530 connected with each other. Each of those components includes processor, memory, router, switches, and other system modules. In accordance with some embodiments, RU 510 and/or DU 520 and/or MT 530 may be communicatively coupled or even combined into one physical unit. The system modules may be installed in the vehicle. For example, the system modules may be installed in an enclosure on the interior of the vehicle, in the trunk, underneath the vehicle, in the wheel well, on the exterior of the vehicle, in the side-view mirrors, or any suitable location suitable for transmitting and receiving wireless signals, or the like. Although a vehicle mobile carrier system 500 is depicted in FIG. 5, it is contemplated that alternative types of mobile carriers described herein may be used. The system 500 may include a transmit/receive element 540, e.g. an antenna for RF, mounted on the top of the vehicle, coupled with the radio signal transceiver 512 of RU 510. This combination of RU transceiver and transmit/receive element is operable to transmit and receive radio signal and to establish air interface 542, which is one of air interfaces 122, 126, and/or 128 to serve wireless access, wireless xHaul, and/or other wireless communication functions, or the like.

The transceiver 512 of RU 510 coupled to the transmit/receive element 540 may be configured to transmit signals to, or receive signals from, cell nodes or other network elements over the air interface 542. For example, in some embodiments, the transmit/receive element 540 may be an antenna configured to transmit and/or receive RF signals. In some embodiments, the transmit/receive element 540 may be an emitter/detector configured to transmit and/or receive infrared (IR), ultraviolet (UV), or visible light signals, for example. In yet other embodiments, the transmit/receive element 540 may be configured to transmit and/or receive both RF and light signals. It will be appreciated that the transmit/receive element 540 may be configured to transmit and/or receive a combination of wireless signals suitable for use by and within embodiments of the present disclosure.

Although the transmit/receive element 540 is depicted in FIG. 5 as a single element, the cell node 120 may include a suitable number of transmit/receive elements 540. More specifically, the mCell 120 may employ multiple-input multiple-output (MIMO) technology. Thus, in one embodiment, the mCell 120 may include two or more transmit/receive elements 540 or multiple antennas for transmitting and receiving wireless signals over the air interface 542.

In an exemplary embodiment, system 500 may comprise a power source 550 inside the vehicle to keep system components operable. The power source 550 may be, for example, a battery in the vehicle that is charged and recharged by the engine of the vehicle, charged by an external power source, or the like. The power source 550 may be power generator, electricity storage device, power transformer, current regulator, and/or other backup power equipment, or the like. The power source 550 may include one or more cell batteries, such as nickel-cadmium (NiCd), nickel-zinc (NiZn), nickel metal hydride (NiMH), and lithium-ion (Li-ion), solid state batteries, solar cell batteries, fuel cell batteries, and/or the like.

In an exemplary embodiment, system 500 may comprise one or more location detection devices 560, such as a global positioning system (GPS) device, a global navigation satellite system (GNSS) receiver, or the like to collect geo-location data, such as longitude and latitude coordinates of the current location of the mCell node, and other environmental information. In addition to, or in lieu of, information from the location detection device 560, the cell node 120 may obtain location information over the air interface 234 from a neighboring cell node and/or determine its location based on the timing of the signals being received from two or more nearby cell nodes or on other trajectory data logged in memory modules of the mCell node. It will be appreciated that a UE, for example the UE 102 illustrated in FIG. 2, may acquire location information by way of a suitable location-determination method while remaining consistent with an embodiment. Geo-location and/or other environmental information may be used to enhance optimization capability for system parameters such as PCI, RSI, and relay routing topology (RRT).

In an exemplary embodiment, system 500 may comprise a dashboard 570 inside the vehicle, or on a separate device, to display some key performance indicators (KPI) and/or some key quality indicators (KQI) and/or some network service status reports and usage density maps of the mCell node and/or about the neighborhood. This dashboard 570 may be part of an operation, administration and management (OAM) terminal of the network operator of the service system and a communication interface with the vehicle operator. This optional dashboard 570 may provide information to assist the operator of the vehicle to move the cell node to where the additional service bandwidth is demanded most.

Though a mobile carrier is depicted and described as a car in system 500 of this exemplary embodiment of the present disclosure, the mobile carrier can be a different type or category of equipment or structure that is movable and operable to support and carry a cell node 120. The mobile carrier may not be attached with a physical wire or cable. Some examples of mobile carriers include an automobile, car, van, bus, boat, train, plane, drone, robot, balloon, or satellite. Other such examples are listed herein but are not intended to be limiting.

FIG. 6 is a table 600 illustrating exemplary protocols used by mCell modules for interface of wireless access, wireless xHaul services, and other supporting services, according to some embodiments of the present disclosure.

The interface with UE(s) may be operable to provide wireless application access service using the Uu protocol or the like. Therefore, the difference between stationary cells and mCells may be transparent to UE(s) and the same UE should work with either stationary cells or mobile cells.

The interfaces with child nodes and parent nodes may be operable to support F1, RLC, GTP, and other protocols as conventional stationary cell nodes and IAB cell nodes do in the network. However, because the interfaces are wireless, payload data of those higher layer protocols may be wrapped up for the air interface by using the Uu protocol, or the like.

In accordance with exemplary embodiments, an mCell node may be operable to multiplex, boost, relay, and/or xHaul signal/data from its wireless interfaces with parent node(s) and child node(s). Uu interface standard at L1 and/or L2 layers between MT of the mCell and parent node(s) and between DU of the mCell and child node(s) allows the mCell to travel relatively to parent nodes(s) and/or child node(s).

A wireless communication system may employ the 3GPP Uu protocol or the like for various embodiments in which wireless access interfaces between the RU/DU of an mCell node and a UE on its front end use. Wireless xHaul relay interfaces between an mCell node and its child nodes on the front end may use a simplified Uu protocol or a modified Uu (Uu-like) protocol, which may, for example, provide tunnels to encapsulate and/or relay xHaul data for its child nodes. Wireless xHaul interfaces between an mCell node and its parent nodes on the back end may use a simplified Uu or Uu-like protocol, which may provide, for example, tunnels to encapsulate and relay xHaul data for its child nodes and hosted UEs, or the like.

In accordance with exemplary embodiments, a Uu protocol or modified Uu protocol may be used for all interfaces of an mCell. The system may be configured to allow an mCell to move relative to neighboring cells, including both mCells and dCells, or the like, for example, at the L1 and L2 layers. Connectivity of an mCell node moving from one parent node to another may be managed by the system in the same way as UE handover from one serving cell to another.

As a corollary of this Uu protocol approach for the interface of mCells with other cell nodes, mCell nodes can work compatibly with cell nodes of conventional cell nodes, such as stationary cells and/or IAB cells, hence prior investment in conventional RAN rollout can be protected.

Because the Uu protocol or modified Uu protocol may be used for mobile for air interface of an mCell with network elements within its coverage rage, the configuration of mCells may be optimized for radio connectivity by systems and methods disclosed herein.

Figure 7:
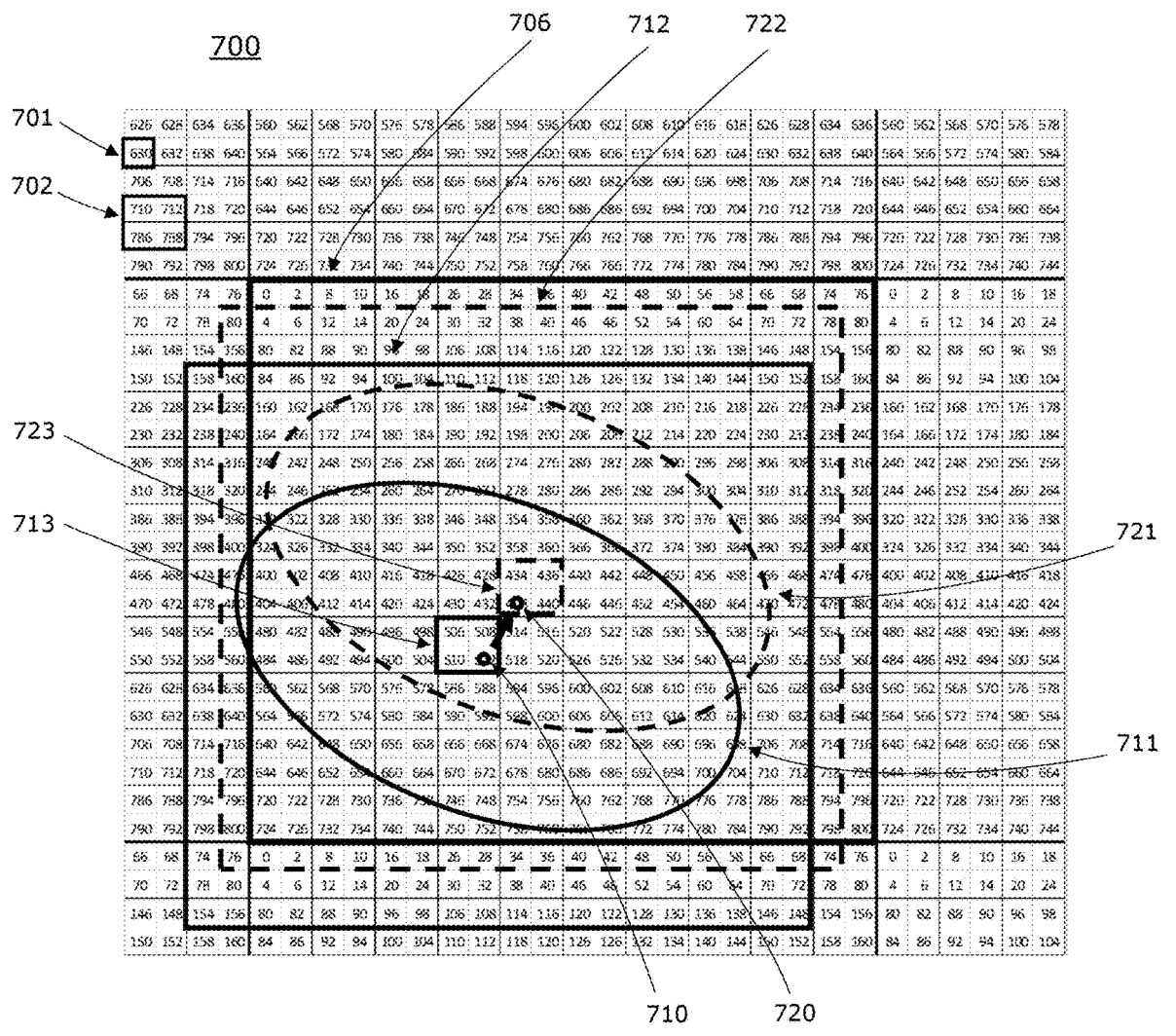
Figure 8:
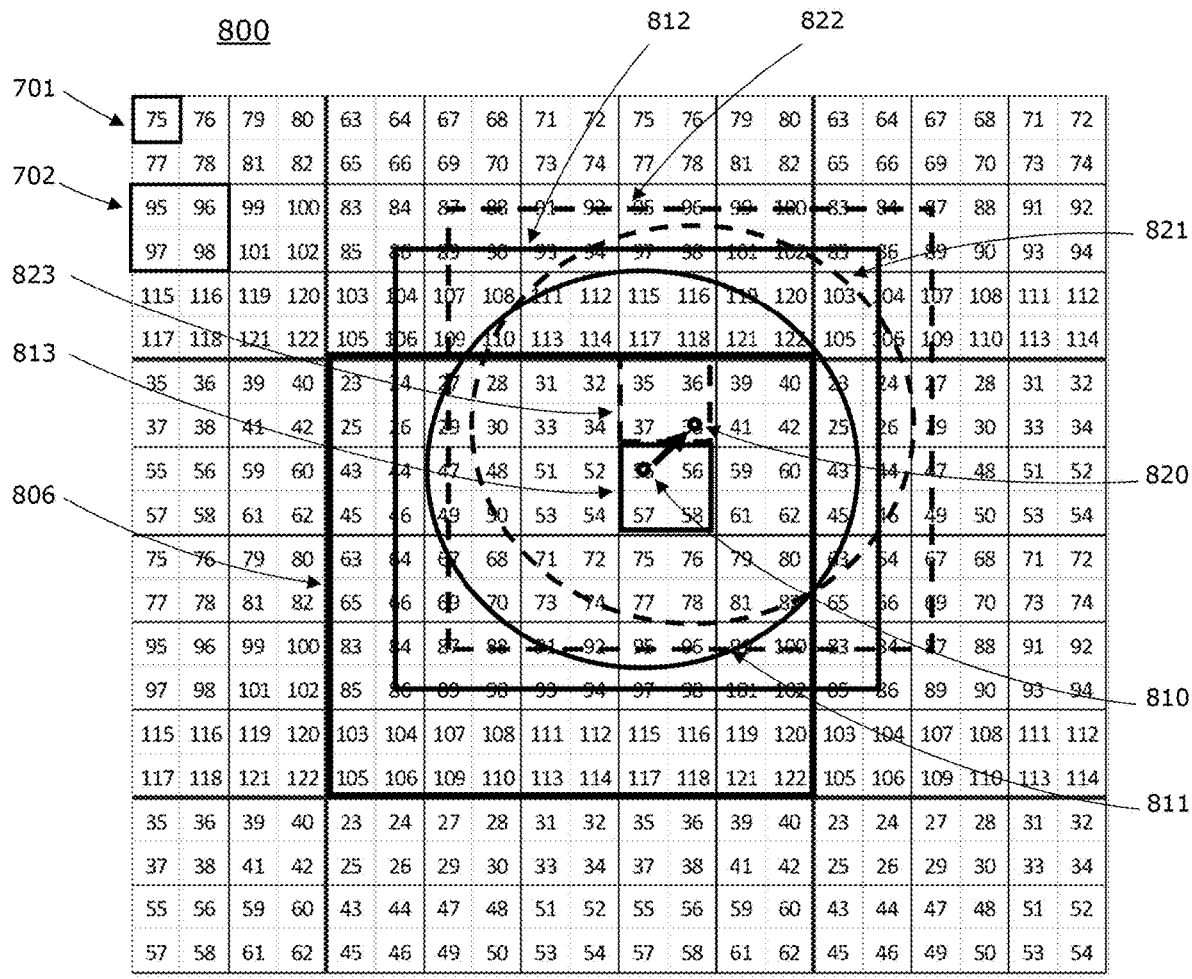
FIG. 8 is a root sequence index (RSI) mapping diagram illustrating an exemplary method of assigning optimal RSI efficiently, based on geo-coordinates of the cell node, according to some embodiments of the present disclosure.

Referring now to FIG. 7 and FIG. 8 and corresponding Tables 1 and 2 below, respectively, exemplary geo-location-based methods and algorithms of Physical Cell Identity (PCI) and Root Sequence Index (RSI) assignment for a cell network/mesh are disclosed, according to some embodiments of the present disclosure. These automatic, autonomous, and efficient methods for dynamic PCI/RSI assignment may be enablers for mCells to serve the network plug-and-play and while moving.

In accordance with exemplary embodiments of the present disclosure, Physical Cell Identity (PCI) and Root Sequence Index (RSI) are configuration parameters that may be assigned per each cell for Uu interface air protocol to work effectively in a wireless communication system. A cell node may encode its PCI and RSI in the radio signal frames at the physical layer of the protocol to identify itself as the source of the radio signal frames to neighboring network elements and devices. A bad PCI/RSI assignment could fail to identify the cell by radio signal, introduce interference to other cells, defeat radio connectivity, and cause network problems, such as failed handovers, service drops and failed service establishments and re-establishments.

For a network of stationary cells, PCI and RSI can be predetermined for each cell to avoid conflict, collision, and confusion with relatively static neighborhood. Because an mCell may travel at a significant speed and in any direction, its neighbor cell list can be changing unpredictably, especially in a dense and dynamic network. For an mCell to be agile, plug-and-play, and maintaining network connection and service continuity and quality, PCI/RSI assignment may to be updated immediately and efficiently per the principle of PCI/RSI optimization, e.g. conflict, collision, and confusion avoidance. FIGS. 7 and 8 with associated Tables 1 and 2 present an exemplary embodiment of such methods and algorithms of PCI/RSI assignment for self-organizing/optimizing network (SON) automation.

PCI may be used to scramble data to allow a UE or other Uu device to separate information from different cell nodes, or the like. If a cell node has a PCI collision, i.e. it shares the same PCI and frequency band with a neighboring cell, a UE, parent cell, child cell, sibling cell, or any accessing network element or device may not be able to distinguish between the two cells and identify the source of radio signal frames. If there is a PCI confusion, i.e., two neighboring cells of a serving cell sharing the same PCI, the handover process cannot succeed because the new serving cell cannot be uniquely identified. This PCI confusion may lead to an increase of dropped calls due to failed handovers as well as an increased channel interference. PCIs of all cells in the coverage range of a cell node should be distinct.

The PCI assigned to a cell node may have an integer value in the range of 0 to 1007 for 5G NR nodes or the like. Because a cellular network may contain a much larger number of cell nodes than the 1008 available PCI values, the same PCI has to be reused for different cells in a large-scale wireless communication system, especially in a dense small-cell network or mesh.

FIG. 7 and Table 1 below illustrate an exemplary mathematical model and method for PCI assignment based on the geographical coordinates of the mCell, pursuant the PCI optimization principle. When the mCell moves, its coverage range moves by the same displacement vector, and the PCI is automatically updated according to Mapping 700 of the new coordinates by an exemplary algorithm shown in Table 1, without the need or effort to detect collision and confusion with new neighboring cells or involvement of a central server or operator or the like.

In accordance with this exemplary embodiment, the geo-coordinates of an mCell may be obtained by a location detection device 560, such as a GPS/GNSS receiver or the like in FIG. 5, or other location detection method or location information from other source. For example, the geo-location may be calculated from velocity vector log, or the like or obtained from the edge network in the neighborhood.

As shown in FIG. 7, Mapping 700 covers the global terrestrial surface by a grid of consecutive Tiles 701, 100'× 100' each. Tile 702 comprises 2×2 consecutive Tiles 701. Tile 706 comprises 10×10 consecutive Tiles 702. The size of Tile 706 is 2000'×2000' for this exemplary embodiment of the present disclosure. The length of Tile 706 side according to the disclosed method is equal to or greater than the PCI Reuse Distance (PCI-RD) of the network. PCI-RD is the minimum required distance between two cell nodes to allow sharing the same PCI without causing unacceptable PCI conflict problem. PCI-RD is typically two times the maximum of cell coverage range radius (CCRR) of the network. However, CCRR varies and is dependent on the device at the far-end of the air interface. For example, the CCRR of an mCell for child cell nodes may be much greater than that with a UE, because a cell node typically operates at higher transmission power level. For a small cell network using 5G FR2 spectrum, such as millimeter wave (mmWave), the CCRR is about 500' to 900'. 2000' is a safe and reasonable PCI-RD to use for the exemplary model. Moreover, the size can be adjusted for the method anyway.

According to exemplary embodiments of the present disclosure, Mapping 700 may assign 8 distinct PCI values to each of 20×20 Tiles 701 in Tile 706. Mapping 700 repeats the same mapping in a Tile 706 to consecutive Tiles 706 throughout the global terrestrial surface. In a system using Mapping 700 to assign PCI, PCI conflict, including both collision and confusion, is completely avoided because two Tiles 701 sharing one same PCI would have to be apart by at least 2000', the PCI-RD.

In accordance with exemplary embodiments of the present disclosure, if an mCell remains within a Title 702, even if it moves to a different smaller Tile 701, its PCI value is intact. The PCI of the mCell is automatically changed if the cell moves from Tile 713, a Tile 702 at Location 710, to a neighboring Tile 723, a Tile 702 at Location 720. The new PCI may be one assigned to Tile 723 by Mapping 700 if the new PCI value is not used by another cell in the Tile 723. The new PCI may be another one of the 8 PCI values assigned to the 4 Tile 701 within the Tile 723, if it is not occupied yet by another cell in Tile 723. If there are multiple PCI values of Tile 723 available, additional rule(s), such as Modulo 4 avoidance, or the like, may be applied to select the optimal one. In some implementations, if all 8 PCI values assigned to Tile 723 are occupied, there is an over-densified situation in the Tile 723 area and the newly arriving cell may be switched to standby/sleep mode waiting for wakeup cue or other dormant or contentious state according to network management strategy. When a Node is set inactive on this condition, there have been 8 active cell nodes in the Tile 723 area (200'×200') already. This may be an indication of over-densified situation and it is not needed to add another cell in the same Tile 702 area. Because cell nodes occupying PCI values of the neighboring Tile 702 are most likely already included in the Neighbor Relation Table (NRT) of the cell node, PCI values of those neighboring cell nodes are readily available to the subject mCell node to know in advance and will not cause additional latency cost.

In accordance with exemplary embodiments, after an mCell moves to a different Tile 702, the NCL for the cell node may need to be updated and all nodes in the list may be notified with the PCI change. In this example, because Tile 702 is 200'×200', an mCell node may remain in the same Tile 702 and keep the same PCI for at least 3.03 sec, assuming its maximal speed is 45 miles/hour or less. In a major metropolitan area, the maximal traffic speed is much lower and hence much less frequent is PCI change.

Table 1 shows an exemplary algorithm that Mapping 700 may use to assign a unique PCI value to each of 20×20 Tiles 701 in a Tile 706 area and repeat the same mapping of Tile 706 to other Tiles 706 over the global terrestrial surface.

principle, as long as (1) the mapping is unique within a Tile 706; (2) the same ordering and mapping pattern is repeated to all other Tiles 706. Therefore, there is slack room to modify the ordering to satisfy additional PCI optimization rules, such as Mod-3, Mod-4, Mod-30 rules, and the like, to minimize inter-cell interference, for example. In this exemplary algorithm, only 800 out of the 1008 available PCI values per 3GPP 5G NR standard are used in Mapping 700. As such, there are 208 PCI values that are spared for other purposes.

The exemplary algorithm shown in Table 1 can be calculated efficiently and locally by a processor of the mCell, given its geo-coordinates (Longitude, Latitude). In some embodiments, the mapping may be calculated by other component(s) of the system.

For purposes of illustration, the shape of the coverage range 711/721 is of some certain shape in FIG. 7. The actual shape of Coverage Range 711/721 may be a circle, an oval, or other shapes. The exemplary method and algorithm remain valid and suitable and satisfy the PCI conflict free requirement as long as the side of Tile 706 is equal to or greater than the PCI-RD of the network.

In accordance with other exemplary embodiments, variation of Mapping 700 and algorithm of Table 1 may be used for PCI assignment, pursuant to the conflict avoidance principle. For example, the solution of this geo-coordinates-based PCI assignment for mCells can be modified by adjusting the linear size ratio (R) of Tile 702 to Tile 701 from 2 (=200'/100') as of Table 1. When R=1, the mathematical model may be simplified since Tile 701 becomes identical to Tile 702. In this exemplary variation, there may be only two PCI values to change to and PCI would need to change more often because Tile 702 is smaller.

Another variation of this solution is to allow an mCell to keep its PCI if it is busy serving access or xHaul when it moves to a new Tile 702. In some embodiments, this may be referred to as an "Exception" policy. The severity of PCI conflict caused by applying this "Exception" policy is relatively slim, because a PCI conflict can only occur with another cell node at about 1800' (=2000'−200') away in a cell mesh or the like.

TABLE 1

A Sample Algorithm for Geo-Coordinates (Longitude, Latitude) → PCI

```
xx = Longitude*69.172miles*5280'/mile*cos(Latitude)
yy = Latitude*69miles*5280'/mile
x = mod(floor(xx,200'), 10)    # integral part of x-coordinate in unit of Tile 702 in Tile 706
y = mod(floor(yy,200'), 10)    # integral part of y-coordinate in unit of Tile 702 in Tile 706
P = 8*(y*10+x)                 # an agile hash function can be imposed here.
```
PCIs assigned to the 4 Tiles 701 in Tile 702 are {P, P+1}, {P+2, P+3}, {P+4, P+5}, and {P+6, P+7}.

In this exemplary algorithm, two PCI values are assigned to each Tile 701, though only the first one is shown in FIG. 7. There are 8 PCI values assigned to each Tile 702 area.

Corollaries of the exemplary algorithm described in Table 1 are (1) Mapping of Tile 706 is repeated to consecutive Tiles 706 throughout the terrestrial surface. (2) Any square area of the size of Tile 706, such as squares 712 and 722, has unique PSI assignment within. (3) PCI conflict (collision or confusion) is completely avoided because two Tiles 701 sharing same PCI value would be apart by at least 2000', the exemplary PCI-RD.

Though the exemplary algorithm shown in Table 1 specifies a particular ordering of distinct PCI values in Tile 706. Those 800 distinct PCI values within Tile 706 can be arranged in any order, without failing the conflict avoidance FIG. 8 is a diagram illustrating a Root Sequence Index (RSI) mapping 800, an exemplary method of assigning optimal RSI efficiently, based on geo-coordinates of a cell Node. Mapping 800 and Table 2 use a similar mathematical model and mapping method as of Mapping 700 shown in FIG. 7 and Table 1 for PCI assignment.

Mapping 800 assigns RSI values to the grid of square tiles over the terrestrial surface. Based on the geographical coordinates of the mCell, when the mCell moves, its coverage range moves by the same displacement vector, and the RSI is automatically updated according to Mapping 800 of the new coordinates by an exemplary algorithm shown in Table 2, without the need or effort to detect collision and confusion with new neighboring cells or involvement of a central server or operator or the like. RSI collision is avoided because Mapping 800 and the exemplary algorithm defined in Table 2 maps distinct RSI values to any square area of size equal to or greater than the RSI Reuse Distance (RSI-RD).

In a 5G network or the like, a UE or a MT of a neighboring cell node has to perform a random access procedure to establish a Uu air interface to connect to the network, establish or reestablish a service connection, perform intra-system handovers, and synchronize for uplink and downlink data transfers. The physical random-access-channel (PRACH) preambles that the UE/MT can use are calculated by the UE/MT through the RSI that the cell node transmits in the system information block 2 (SIB2) through the PRACH. Namely, the SIB 2 contains the RSI which indicates the index of the logical root sequence to derive the Physical Random-Access Channel (PRACH) preamble sequence to start a random-access procedure. The random-access procedure may be used for service connection establishment and re-establishment, intra-system handovers and UE synchronization for uplink and downlink data transfers. Whenever two or more neighbor cells operate in the same frequency band and have the same RSI parameter, this results in the connected UE/MT calculating the same PRACH preambles, increasing the occurrence of preamble collisions amongst the requests coining from various other UE/MTs. This problem is known as RSI collision, and can lead to an increase of failed service establishments and re-establishments, as well as an increase of failed handovers.

The RSI assigned to a cell node may have an integer value in the range of 0 to 137 and 837 for a short and long sequence scenario respectively, according to 5G NR standard or the like. Because long sequence scenario is applicable only for cells using FR1 (sub-6 GHz) bands, cells using FR2 bands, including mmWave, have to take short sequence scenario and the associated 138 distinct RSI values. Both numbers of available distinct RSI values are very small. There may be a larger number of cell nodes in a large-scale wireless communication system, especially in dense small cell network or mesh. RSI value set has to be reused, while maintaining the optimal RSI assignment principle, i.e. unique RSI in the coverage range of each cell node.

As shown in FIG. 8, Mapping 800 covers the global terrestrial surface by a grid of consecutive Tiles 701, 100'× 100' each. Tile 702 comprises 2×2 consecutive Tiles 701. Tile 806 comprises 5×5 consecutive Tiles 702. The size of Tile 806 is 1000'×1000' for this exemplary embodiment of the present disclosure. The length of Tile 806 side according to the disclosed method is equal to or greater than the RSI Reuse Distance (RSI-RD) of the network. RSI-RD is the minimum required distance between two cell nodes to allow sharing the same RSI without causing unacceptable RSI collision problem. RSI-RD is typically two times the maximum of cell coverage range radius (CCRR) of the network. Moreover, the size can be adjustable for the exemplary method anyway.

According to an exemplary embodiment of the present disclosure, Mapping 800 assigns an RSI value to each of 10×10 Tiles 701 in Tile 806. Mapping 800 repeats the same mapping in Tile 806 to consecutive Tiles 806 throughout the global terrestrial surface. In a system using Mapping 800 to assign RSI, RSI collision is completely avoided because two Tiles 701 sharing one same RSI would have to be apart by at least 1000', the RSI-RD.

In accordance with exemplary embodiments of the present disclosure, if an mCell remains within a Title 702, even if it moves to a different smaller Tile 701, its RSI value is intact. The PCI of the mCell is automatically changed if the cell moves from Tile 813, a Tile 702 at Location 810, to a neighboring Tile 823, a Tile 702 at Location 820. The new RSI may be one of the four (4) assigned to Tile 823 by Mapping 800 if the new RSI value is not used by another cell in the Tile 823. If there are multiple RSI values of Tile 823 available, additional optimization rule(s) may be applied to select the optimal one. If four (4) RSI values assigned to Tile 823 are occupied, there is an over-densified situation in the Tile 823 area and the newly arriving cell may be switched to standby mode or sleep mode waiting for wakeup cue or other dormant or contentious state according to network management strategy. When a Node is set inactive on this condition, there have been 4 active cell nodes in the Tile 823 area (200'×200') already. This may be an indication of over-densified situation and it is not needed to add another cell in the same Tile 802 area. Because cell nodes occupying PCI values of the neighboring Tile 802 are most likely already included in the Neighbor Relation Table (NRT) of the cell node, RSI values of those neighboring cell nodes are readily available to the subject mCell node to know in advance and will not cause additional latency cost.

In accordance with exemplary embodiments, after an mCell moves to a different Tile 702, the NCL for the cell node may need to be updated and all nodes in the list may be notified with the RSI change. In this example, because Tile 702 is 200'×200', an mCell may remain in the same Tile 702 and keep the same RSI for at least 3.03 sec, assuming its maximal speed is 45 miles/hour or less. In a major metropolitan area, the maximal traffic speed is much lower and hence much less frequent is RSI change.

Table 2 shows an exemplary algorithm that Mapping 800 may use to assign a unique RSI value to each of 10×10 Tiles 701 in a Tile 806 area and repeat the same mapping of the Tile 806 to other Tiles 806 throughout the global terrestrial surface.

TABLE 2

A Sample Algorithm for Geo-Coordinates (Longitude, Latitude) → RSI xx = Longitude*69.172miles*5280'/mile*cos(Latitude)
yy = Latitude*69miles*5280'/mile
x = mod(floor(xx,200'), 5)        # integral part of x-coordinate in unit of Tile 702 in Tile 806
y = mod(floor(yy,200'), 5)        # integral part of y-coordinate in unit of Tile 702 in Tile 806
R = 4*(y*5+x)+23                  # a simple hash function applied
RSIs assigned to the 4 Tile 801 in the Tile 802 are {R, R+1, R+2, R+3}.

Corollaries of the exemplary algorithm described in Table 1 are (1) Mapping of a Tile 806 is repeated to consecutive Tiles 806 throughout the terrestrial surface. (2) Any area of the shape and size of Tile 806, such as square area 812 and 822, has distinct RSI values within. (3) RSI collision is completely avoided because two Tiles 701 sharing same RSI value would be apart by at least 1000', the exemplary RSI-RD.

Though the exemplary algorithm shown in Table 2 specifies a particular ordering of distinct RSI values in Tile 806. Those 100 distinct RSI values within Tile 806 can be arranged in another suitable order, without failing the RSI collision avoidance principle, as long as (1) the mapping is unique within a Tile 806; (2) the same ordering and mapping pattern is repeated to all other Tiles 806. Therefore, there is slack room to modify the ordering to satisfy additional RSI optimization rules. In this exemplary algorithm, only 100 out of the 138/838 available RSI values per 3GPP 5G NR standard or the like are used in Mapping 800. As such, there are 38/738 RSI values that are spared for other purposes.

The exemplary algorithm shown in Table 1 can be calculated efficiently and locally by a processor of the mCell, given its geo-coordinates (Longitude, Latitude). In some embodiments, the mapping may be calculated by other component(s) of the system.

For illustration purpose, the shape of the coverage range 811/821 is of some certain shape in FIG. 8. The actual shape of Coverage Range 811/821 may be a circle, an oval, or other shapes. The exemplary method and algorithm remain valid and suitable and satisfy the RSI collision free requirement as long as the side of Tile 806 is equal to or greater than the RSI-RD of the network.

In accordance with other exemplary embodiments, variation of Mapping 800 and algorithm of Table 2 may be used for RSI assignment, pursuant to the RSI collision avoidance principle. For example, the solution of the geo-coordinates-based RSI assignment method can be modified by adjusting the linear size ratio (R) of Tile 702 to Tile 701 from 2 (=2007100') as of Table 2. When R=1, the mathematical model may be simplified since Tile 701 becomes identical to Tile 702. In this exemplary variation, there may be only one RSI values to change to and RSI would need to change more often because Tile 702 is smaller. Another variation of this solution is to allow an mCell to keep its RSI if it is busy serving when it moves to a new Tile 702. In some embodiments, this may be referred to as the "Exception" policy. The severity of RSI collision caused by applying this "Exception" policy is slim, because an RSI collision can only occur with another cell node at about 800' (=1000'-200') away in a cell mesh.

Figure 9:
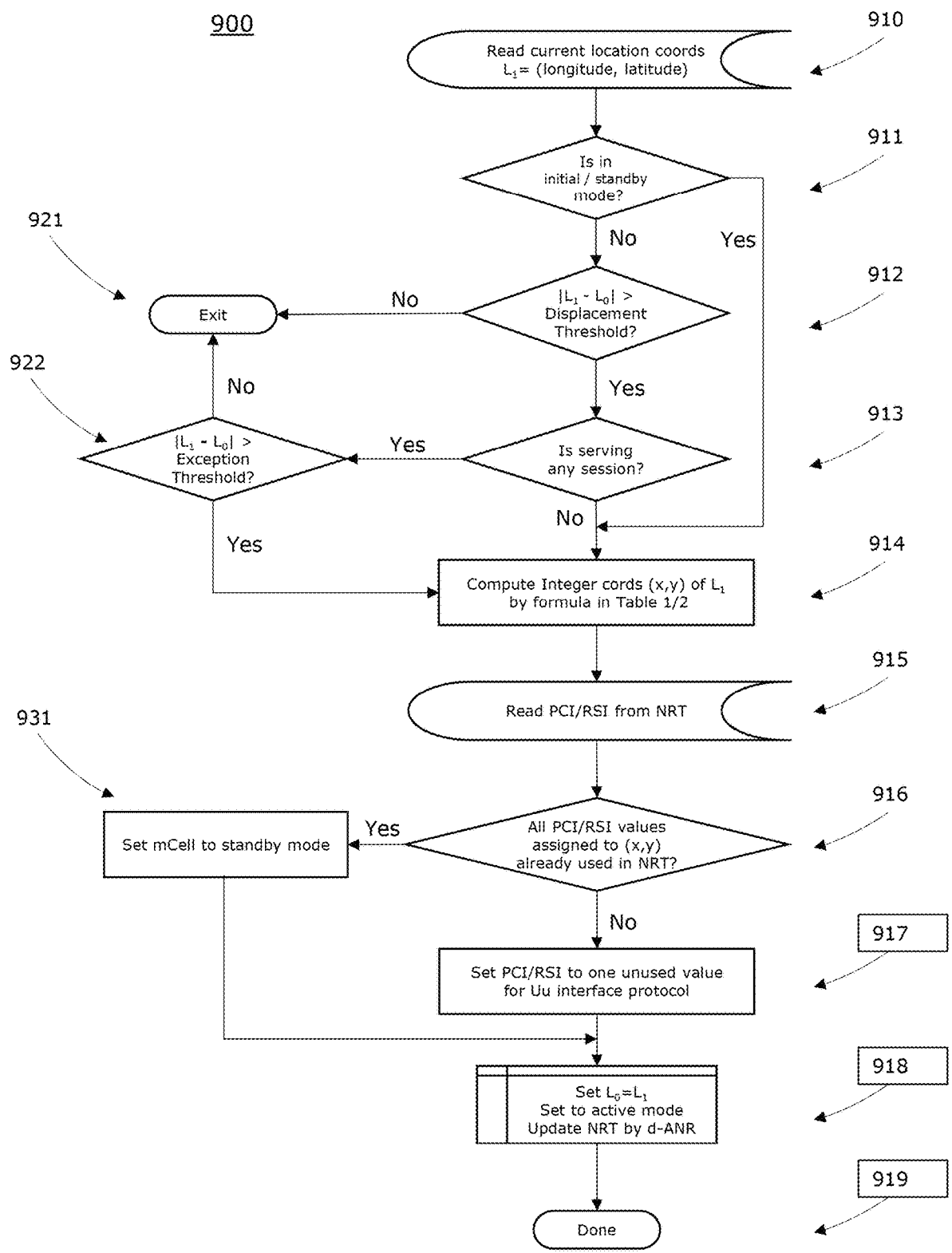
FIG. 9 shows a flowchart illustrating an exemplary process to update PCI/RSI for an mCell according to some embodiments of the present disclosure.

FIG. 9 shows the flowchart of an exemplary method 900 to update PCI/RSI for an mCell by using Mappings 700 and 800 and algorithms of Tables 1 and 2, according to some embodiments of the president disclosure. Method 900 may be executed when the cell joins the network initially. Method 900 may be executed periodically at a frequency configured by the system, based on the service demand level, empirical usage data, business model, and/or traffic pattern of the environment.

In some exemplary embodiments, at step 910, the current location coordinates are read by the system. The coordinates may include, for example, longitude and latitude of the mCell location, or the like. After step 911, the system may determine whether the mCell is in the initial mode or the standby mode. If the mCell is in the initial/standby mode, the method 900 may skip steps 912/913 and advance to step 914, where integer coordinates (x, y) of the location may be computed, for example, by algorithms provided herein in Table 1 or Table 2 above. If the mCell is not in the initial/standby mode at step 911, the method may advance to step 912, where it is determined whether the displacement, with respect to the previous location ($L_0$) when the PCI/RSI was updated, is greater than the displacement threshold. If the displacement is not greater than the displacement threshold, i.e. the displacement is not sufficiently significant to warrant consideration for PCI/RSI update, the method ends at step 921 and exits the procedure cycle without changing the PCI/RSI.

In some implementations, the Displacement Threshold and the Exception Threshold of Condition Blocks 912 and 922 are two parameters that may be configured by the system based on the traffic condition of the environment and/or the demand level of the service. The Displacement Threshold is typically set to the linear size of a Tile 702. An mCell moving by a displacement exceeding this threshold is subject to PCI/RSI update. The Exception Threshold is the displacement allowance for an mCell to keep its PCI/RSI values for busy serving active sessions. The Exception Threshold is typically larger than the Displacement Threshold and is set by the Exception Policy of the system. The larger the Exception Threshold is, the less frequent PCI/RSI change is, and more likely PCI/RSI conflict/collision could occur.

In some implementations, at step 913, the method 900 may determine whether the mCell is busy serving any access/xHaul session(s) for UE(s) or neighboring cell(s). If yes, the method advances to step 922. In step 922, the method determines whether the displacement ($|L_1-L_0|$) is greater than the exception threshold, or the like. If yes, the method advances to step 914. If no, the method 900 ends at step 921. At step 914, the method computers integer coordinates and advances to step 915. At step 915, the method reads PCI(s)/RSI(s) from NRT, or the like.

In some implementations, the condition block 916 checks if all PCI/RSI values assigned to new location Tile 702 at (x,y) have been used by other neighboring cells already, according to data read from the NRT at step 915. If it is affirmative, the over-densification condition occurs and the new arriving mCell is put to the standby mode for a period time until it is waked up or until the next time Procedure 900 is executed.

Step 917 of Procedure 900 assigns one of the unused PCI values mapped to the location Tile 702 at (x,y). If there are multiple choices, additional optimization criteria can be considered.

In some implementations, at step 918 is the method 900 sets PCI/RSI values for the cell to apply Uu protocol for air interfaces. $L_0$, the prior geo-coordinates may be updated with the current location $L_1$, saved for Step 912 of the next cycle. The Neighbor Relation Table (NRT) of the mCell may be updated by conducting distributed automatic neighbor relation (d-ANR), a SON feature that is performed locally by the cell and its neighboring cells without a centralized manager.

Figure 10:
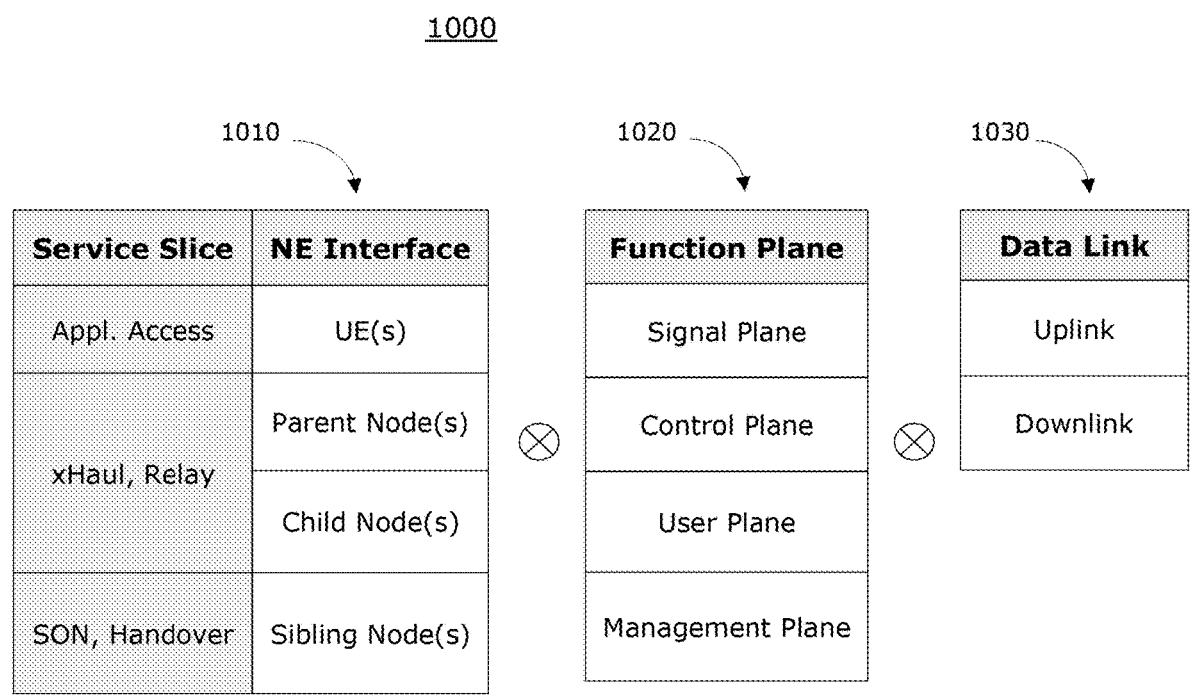
FIG. 10 shows the logical structure of the Multiplex Tensor for separate data streams/channels of an exemplary cell mesh according to some embodiments of the present disclosure.

FIG. 10 shows the logical structure of a Multiplex Tensor 1000 of separate wireless data streams/channels that an mCell may serve in an exemplary cell mesh. Multiplex Tensor 1000 may be a tensor product of three one-dimensional linear lists Slice/Interface List 1010, Functional Plane List 1020, and Data Link List 1030.

List 1010 of Service Slices and Interfaces may include (1) Application Access Slice via air interfaces with UEs. Since a cell node could serve multiple UEs simultaneously, there would be multiple ($N_{UEs}$) data streams/channels of this slice to be multiplexed; (2) Relay & xHaul Slice via air interface with parent(s)/child cell(s), up/down the routing topology. There would be multiple ($N_{parents}+N_{children}$) data streams/channels of this slice to be multiplexed; (3) SON & Handover Slice via air interfaces with sibling cell(s). There would be multiple ($N_{siblings}$) data streams/channels of this slice to be multiplexed;

List 1020 of Function Planes includes (1) Signal Plane, (2) Control Plane, (3) User Plane, and (4) Management Plane, according to some exemplary embodiments.

List 1030 of data links includes (1) Uplink, (2) Downlink, which are north bound and south bound along the routing topology respectively.

The number of data streams/channels to be multiplexed would be up to $(N_{UES}+N_{parents}+N_{children}+N_{siblings})*4*2$. Not all elements in the multiplex tensor 1000 share the same attributes and requirements. For example, (1) different UE might be under different SLA requirements; (2) the User Plane may require larger data speed while The Control Plane is imposed with stringent latency budget; (3) the downlink volume to a consumer's UE is typically higher than the uplink volume from it;

Under the constraint of limited bandwidth allotted to the network, to maximize the performance and quality of the network and service, resource allocation and multiplexing method needs to be optimized. Because the cell neighborhood and the relay routing topology (RRT) change accordingly if the mCell moves, multiplex optimization would need to be performed dynamically and integrally with the whole tensor.

In some implementations, network systems support this multiplexing tensor fragmentarily without overall integral management. Configuration may be specified by equipment providers at installation time. Therefore, embodiments of the present disclosure may provide improvement by open, integral, and dynamic resource division and allocation to serve the complete multiplex tensor. QoS and KPIs of the whole multiplex tensor may be defined, measured, and used to update resource and multiplex configuration for the multiplex tensor integrally and dynamically. For example, if $N_{UES}$ decreases after the mCell moves, bandwidth allocated for the relay slice can be increased and/or transport multiplex method be switched from TDM to FDM if possible. Such system parameter changes may also be used to update and optimize the RRT accordingly. Another example of applying integral multiplex tensor management is extending Control/ User Planes Separation (CUPS) as illustrated in FIGS. 11 and 12, according to exemplary embodiments of the present disclosure.

FIG. 11 is a table 1100 illustrating an example of integral multiplex tensor configuration with extended Control/User Planes Separation (CUPS) for an exemplary cell mesh. In accordance with embodiments of the present disclosure, by way of example, there may be up to $N(=N_{UES}+N_{parents}+N_{children}+N_{siblings})*4*2$ data streams multiplexed at an mCell node. The system may configure each data stream of the multiplex tensor with (1) radio frequency band used for the air interface; (2) bandwidth of the allocated RF resource; (3) multiplex method for transport, which may be a combination of Time Division Multiplexing (TDM), Frequency Division Multiplexing (FDM), Code Division Multiplexing (CDM), and/or Space Division Multiplexing (SDM); (4) Uplink (UL)/Downlink (DL) duplex method, which may be time-division duplex (TDD) or frequency-division duplex (FDD) or the like; (5) Relay Routing Topology (RRT; (6) other multiplex related parameters, and/or the like. Each of multiplexed data streams may be allocated a given spectrum band, bandwidth, and/or other multiplexing configuration parameters by the system in accordance with embodiments of the present disclosure. Those resource allocations may be dynamically adjusted according to service level agreement (SLA) and policy and measured quality of service (QoS) key performance indicators (KPIs). In some embodiments, not all multiplexed channels adhere to the same topology. Multiple topologies may be used in accordance with systems of the present disclosure.

The system design principle of CUPS is a particular example of applying multiplex stratification shown in FIG. 10, specifically to the control plane (CP) and the user plane (UP). These two planes may have different system requirements: (1) the CP has a much smaller data rate than of the UP; (2) the CP has a more stringent latency budget than of the UP; (3) the CP requires high reliability while the UP requires high data speed and capacity. According to some embodiments, the control and user plane separation (CUPS) may be applied to a cell mesh of stationary cells and mobile cells. For example, as shown in FIG. 11, the CP and the UP may be configured with different RF bands (Sub-6 v. mmWave), bandwidths (10 MHz v. 100 MHz, per channel), duplex methods (FDD v. TDD) and even relay routing topology (single-hop star topology v. multi-level hierarchical topology of acyclic directed graph (ADG)). Referring again to FIG. 11, Table 1100 may vary according to actual embodiments of the present disclosure.

Figure 12A:
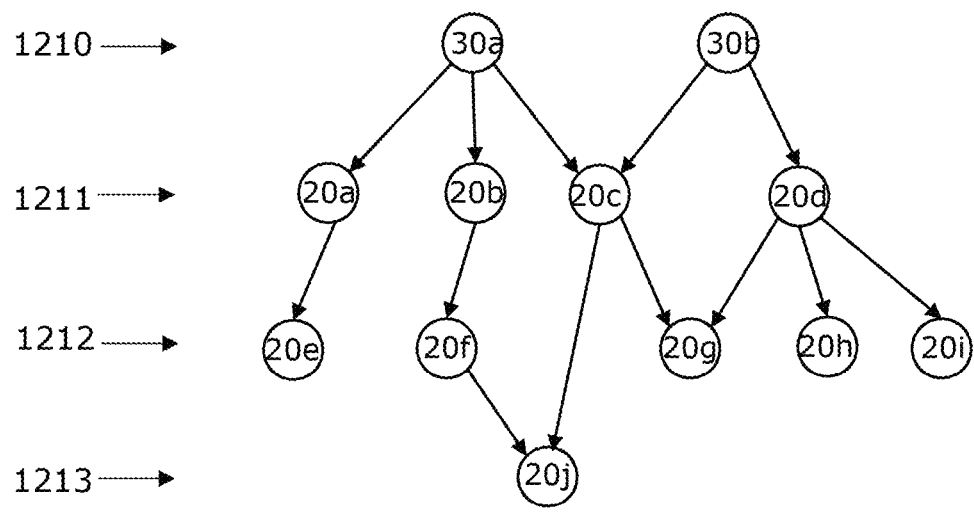
FIG. 12A illustrates a topology of a user plane (UP) that may be a multi-hop, hierarchical, acyclic directed graph (ADG), in accordance with embodiments of the present disclosure.
Figure 12B:
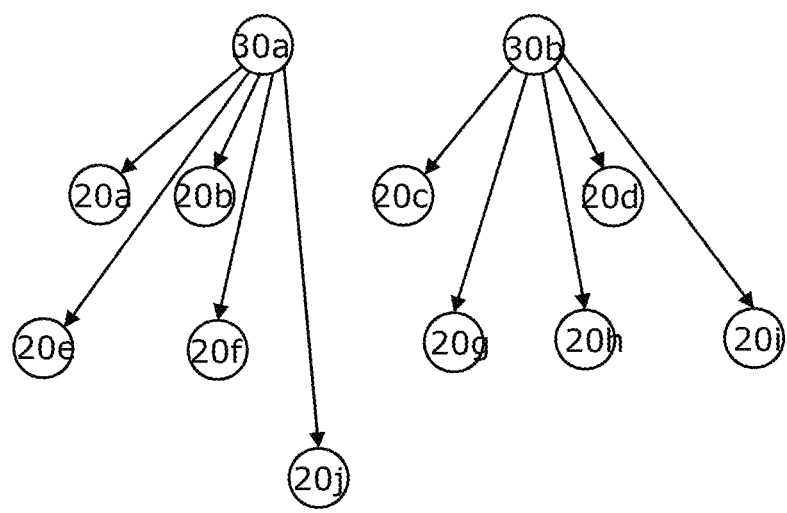
FIG. 12B illustrates a topology of the control plane (CP) that may be a single-hop star topology rooted at dCells, in accordance with some embodiments of the present disclosure.

FIGS. 12A and 12B further illustrate different exemplary relay/xHaul routing topologies 1200a, 1200b (RRT) for CUPS of a cell mesh in accordance with exemplary embodiments. FIG. 12A illustrates a topology 1200a of the user plane (UP) that may be a multi-hop, hierarchical, acyclic directed graph (ADG), in accordance with embodiments of the present disclosure. FIG. 12B illustrates a topology 1200b of the control plane (CP) that may be a single-hop star topology rooted at dCells, in accordance with some embodiments of the present disclosure.

In accordance with exemplary embodiments of the present disclosure, Topology 1200a of the user plane (UP) may be a multi-hop, hierarchical, acyclic directed graph (ADG) as of a typical IAB network or the like.

A topology may comprise dCells 30a, 30b, and mCells/iCells 20a, 20b, 20c, and 20d. Nodes 20a-d are at the 1-hop level 1211, or one hop away from dCells 30a or 30b. The topology may further comprise nodes 20e, 20f, 20g, 20h, and 20i at the 2-hop level 1212, or 2 hops away from dCell 30a or 30b via relay of parent nodes 20a-d. The topology may also comprise node 20j at the 3-hop level 1213 or 3 hops away from dCell 30a or 30b, via relay of two parent nodes 20c and 20f in this particular example. In some embodiments, an mCell/iCell node 20 may be communicatively coupled to a dCell 30 via one (e.g. 30a-20a), two (e.g., 30b-20d-20g) or three (e.g., 30a-20b-20f-20j) hops.

In accordance with exemplary embodiments, a node 20 (i.e. one of node 20a, 20b, 20c, 20d, 20e, 20f, 20g, 20h, 20i, and 20j) may be a leaf node or may have one or more child node(s) in the RRT. A node 20 may have one or more parent nodes(s) until dCell 30a and/or 30b is reached. A node 20 may connect to multiple parent nodes of different hop orders. For example, node 20d is the parent of multiple child nodes 20g, 20h, and 20i, i.e. Node 20 may aggregate and/or relay and/or xHaul for one, two, or all three child nodes 20g, 20h, and 20i.

Node 20g may be a child node of multiple parent nodes 20c, 20d. The data xHaul for Node 20g can be supported by different parent node at different time or distributed to both parent nodes for, e.g. load balancing, or the like. This sort of carrier aggregation (CA), also referred to as a redundant route approach with multi-path parallel connections, helps to balance the load and improve the overall performance of the system. A redundant route may provide extra flexibility to facilitate "handover" or "handoff." For example, when a node moves out of the range of a parent node, it may rely on a redundant parent node, or the like, to maintain connectivity and continuity.

In accordance with exemplary embodiments of the present disclosure, Topology 1200b of the control plane (CP) may be a single-hop star topology rooted at dCells, as most conventional wireless networks. In some embodiments, a lower frequency band is use as shown in FIG. 11 and may provide the CP with a wider coverage range to improve connection continuity and performance by reducing disruption and latency in the case of a data bearer link failure or handover event. These features are beneficial especially for moving mCell nodes because the relative stability and reliability of the control plane complement frequent and dynamic changes of Uu interface parameters and RRT of the user plane of mCells.

The topologies 1200a and 1200b depicted in FIG. 12 are merely examples. Although a certain number of nodes and RRT connection are depicted in FIG. 11, topology 1200 may be scaled up or down, depending on the system configuration. The topology 1200 may also be changed or updated dynamically because of the mobility of mCells. It is contemplated that more components, for example, dCells 30a, 30b and mCells 20a-j may be utilized within a system in accordance with the present disclosure.

The RRT topology for the control plane may not need to change often for an mCell because the sub-6 spectrum offers longer effective range with its parent node and is adequate to sustain the mobility of the mCell. To the contrary, the RRT topology for the user plane needs to be updated often because the FR2 spectrum offers shorter effective range with its parent node and may not be able to sustain the mobility of the mCell.

One of the key enablers of this invention is an algorithm to dynamically determine the topology of the cell mesh. Here is an example of such a mechanism and algorithm that determines, for each cell in the acyclic directed graph (ADG) topology of the cell mesh, its parent node(s), i.e., the best neighboring cell(s) to relay/xHaul to, in that the inherent latency or cost of xHaul is minimized.

In an exemplary embodiment of the present disclosure, each cell in the mesh makes a data vector of RRT-optimization related attributes (e.g. Cell Id and/or other cell attributes and credentials, RRT parent cell id, xHaul-Cost, timestamp of origin, and potentially other information) available to neighboring cells, via the IAB adaptation layer header or by beacon signal broadcasting or the like. For each cell, its xHaul-Cost and RRT parent node(s) are set according to Table 3 below.

TABLE 3

A Sample Algorithm for RRT optimization using QoS/KPI of Multiplex Tensor

For each cell X, for each procedural cycle, do:
1) Scan broadcast signal and obtain $K_i$, the RRT KPI vector of the multiplex tensor of neighboring cells $Y_i$, i=1..N.
2) Set xHaul-Cost of X.
   = 0 or backhaul cost of X    if X is a dCell;
   = $\infty$    if N=0, i.e. X doesn't detect any neighboring cell;
   = xHaul-Price of X + min{short-haul cost between X and $Y_i$ + xHaul-Cost of Cell $Y_i$ | i=1..N}
       otherwise;
   where
   - xHaul-Price of X is a measurement of resource consumption and service impact for relay/xHaul hop at X. It is a function of the multiplex tensor of X.
   - Short-haul cost is the cost of short-haul between two cells, e.g. a cost function of the air interface latency (= the timestamp of X receiving Ki - the origin timestamp of $K_i$), a real-time empirical data from (1).
3) Set The RRT Parent Node of X.
   = 0 or NA    if X is a dCell;  # No wireless xHaul is needed for a dCell.
   = Y(s) that attain(s) the finite minimum xHaul-Cost of (2).

The RRT optimization procedure may be executed when the cell joins the network initially. It may be executed periodically at a frequency configured by the system, based on the service demand level, empirical usage data, business model, and/or traffic pattern of the environment. The frequency may be different for different cells. The procedure may be stochastic, parallel, and asynchronous, i.e. synchronization among cells is not needed.

The RRT is optimized by this algorithm that sets the parent node, the cell to relay and xHaul to, for each mCell in the cell mesh. The criterion of the algorithm is for a cell to reach a dCell at minimum cost. (The next relay node is not necessarily the closet neighboring cell.) By this algorithm, a cell would never forward any traffic to a cell which is not routed toward a dCell, i.e. of infinite xHaul-Cost, preventing futile effort. It also avoids forming a cyclic loop in the topology.

The xHaul-Price of a cell is a crucial measurement impacting RRT optimization according to some embodiments of the present disclosure. It is a part of xHaul-Cost and is a function of the multiplex tensor and the whole multiplex tensor should be taken into consideration integrally. In one example, xHaul-Price is defined as the latency caused by relay hop processing at the cell, and, therefore, the resultant RRT defines the fastest route for a cell to reach a dCell and then the EN/CN as shown in FIG. 1. In another example, xHaul-Price is simply defined as 1, a constant, and, therefore, the resultant xHaul-Cost is the hop count and the result RRT defines the least hop route for a cell to reach a dCell, if relatively small interface cost is ignored.

These criteria can be further enhanced to weigh in additional consideration, e.g. inter-cell interference (ICI) avoidance and other performance quality factors. RAN enhancements which supports awareness of IAB deployment and architecture can also be considered, e.g. RIC policies based on the hop count and RRM measurements.

This method and algorithm for RRT optimization is an example of Hop-by-Hop distributed solution. It is performed locally by the processor of the cell and uses data collected from the radio neighborhood without involvement of a central facility or server. It is automatic, autonomous, dynamic, and efficient to perform frequently to maintain a highly reliable RRT. However, if the cell mesh adopts the CUPS configuration 1100 as shown in FIG. 11, an End-to-End centralized solution by central network management server over the control plane connection may be feasible too.

A Topology of a UE may be determined similarly in that it is the optimization algorithm is used to determine the optimal cell to hop on. The KPI or cost weight can be performance measurements of the handshaking beacon signal and equivalent others. Thus, our invention addresses the overall E2E quality, including the return path for those end user devices to use for the transmission of upstream data. Though the return path is not necessarily the same as the uplink path, having a reference for the return path characteristics is essential for efficient and effective communications in support of dynamically changing topologies and application mixes.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Other embodiments of the disclosure will be apparent to those skilled in the art from consideration of the specification and practice of the disclosure disclosed herein. Although specific advantages have been enumerated above, various embodiments may include some, none, or all of the enumerated advantages. It is intended that the embodiments described above be considered as exemplary only, with a true scope and spirit of the disclosure being indicated by the appended claims. Moreover, none of the features disclosed in this specification should be construed as essential elements, and therefore, no disclosed features should be construed as being part of the claimed disclosure unless the features are specifically recited in the claims. In addition, it should be understood that any of the features disclosed on any particular embodiment may be incorporated in whole or in part on any of the other disclosed embodiments. In any interpretation of the claims appended hereto, it is noted that no claims or claim elements are intended to invoke or be interpreted under 35 U.S.C. 112(f) unless the words "means for" or "step for" are explicitly used in the particular claim.

In general, any combination of disclosed features, components and methods described herein is possible. Steps of a method can be performed in any order that is physically possible. All cited references are incorporated by reference herein.

Although embodiments have been disclosed, it is not desired to be limited thereby. Rather, the scope should be determined only by the appended claims. While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims. The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the disclosure.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A mobile cell (mCell) for use in a wireless communication system, the mCell comprising:
   a mobile carrier;
   a mobile cell node carried by the mobile carrier and configured to provide wireless communication connectivity within a radio range surrounding the mobile cell node, the mobile cell node having one or more processors operable to:
   communicatively connect with a user equipment (UE) when the UE is within the radio range; and
   communicatively connect with other mobile cell nodes and stationary cell nodes to establish a wireless connectivity between the UE and the wireless communication system,
   wherein the mobile cell node maintains the wireless connectivity between the UE and the wireless communication system while the UE is within the radio range by automatically adjusting system parameters both while the mobile cell node is moving and while the mobile cell node is stationary, thereby forming a mesh-network for wireless communication and enabling plug-and-play connectivity,
   wherein:
   the mobile cell node includes a location detection device or calculation means for detecting or calculating a real-time geo-location of the mobile cell node,
   the system parameters include a physical cell identity (PCI), and
   the mobile cell node is configured to automatically adjust said system parameters upon movement of the mobile cell node, the automatic adjustment of said system parameters including generation of a new PCI using the real-time geo-location detected or calculated by the location detection device or calculating means, autonomously and without involvement of a central server or operator.

2. The mCell of claim 1, wherein the system parameters comprise a root sequence index (RSI).

3. The mCell of claim 1, wherein the processor is further operable to dynamically configure the system parameters while the mCell is moving and while the mCell is stationary.

4. The mCell of claim 1, wherein the processor is further operable to support integrated access and backhaul (IAB) protocols and provide wireless data relay and wireless xHaul to the other mobile cell nodes and stationary cell nodes while the mobile cell node is moving and while the mobile cell node is stationary.

5. The mCell of claim 1, wherein the processor is further operable to perform integrated access and backhaul (IAB) relay routing topology (RRT) optimization while the mobile cell node is moving and while the mobile cell node is stationary.

6. The mCell of claim 1, wherein the UE is at least one of a smartphone, a computer, an IoT device, a drone, a connected vehicle, a laptop embedded equipment (LEE), a laptop mounted equipment (LME), a mobile station, a fixed or mobile terminal, a subscriber unit, a robot, a medical device and applications, an industrial device, a consumer electronics device, or a device operating on a commercial or an industrial wireless network.

7. The mCell of claim 1, wherein system parameter adjustment is automatic, autonomous and dynamically adjusted upon the mobile cell node moving into the radio range of an active and connected node of the system.

8. The mCell of claim 1, wherein the processor is further operable to communicatively connect with a UE, a parent node, a child node, and neighboring cell nodes using wireless air interface protocol.

9. The mCell of claim 1, wherein the mobile carrier comprises at least one of a land transportation vehicle, a watercraft, and or an aircraft.

10. The mCell of claim 1, wherein the mobile cell (mCell) is operable to be repositioned autonomously and dynamically to optimize the network.

11. A method of wireless communication within a plug-and-play network, the method comprising:
providing a mobile cell (mCell) for use in a wireless communication system, the mCell comprising:
a mobile carrier;
a mobile cell node carried by the mobile carrier, the mobile cell node configured to provide wireless communication connectivity within a radio range surrounding the mobile cell node;
communicatively connecting the mobile cell node with a user equipment (UE) when the UE is within the radio range;
communicatively connecting the mobile cell node with other mobile cell nodes and stationary cell nodes to establish a wireless connectivity between the UE and the wireless communication system; and
automatically adjusting, by the mobile cell node, system parameters, the system parameters comprising at least a physical cell identity (PCI) and root sequence index (RSI) for allowing the mobile cell node to maintain wireless connectivity with the system both while the mobile cell node is moving and while the mobile cell node is stationary, thereby forming a network for wireless communication and enabling plug-and-play connectivity, wherein:
the mobile cell node includes a location detection device or calculating means for detecting or calculating location coordinates of the mobile cell node, and
the mobile cell node is configured to automatically adjust said system parameters upon movement of the mobile cell node by using, at least, the location coordinates detected or calculated by the location detection device or calculating means, autonomously and without involvement of a central server or operator, and
when the mobile cell node moves, the PCI and the RSI are automatically updated according to a mapping algorithm of new said location coordinates.

12. The method of claim 11, wherein the processor is further operable to dynamically configure the system parameters while the mobile cell node is moving and while the mobile cell node is stationary.

13. The method of claim 11, wherein the wireless communication system supports integrated access and backhaul (IAB) protocols and the cell node provides wireless access service, wireless relay, and wireless xHaul.

14. The method of claim 11, wherein system parameter adjustment is automatic, autonomous, and dynamically adjusted upon the mobile cell node moving into the radio range of an active and connected node of the system.

15. The method of claim 11, further comprising:
repositioning the mobile cell node autonomously and dynamically to optimize the network.

16. A system of wireless communication, the system comprising:
a mobile carrier;
a mobile cell node carried by the mobile carrier, the mobile cell node having one or more processors operable to:
communicatively connect with a user equipment (UE) when the UE is within a radio range surrounding the mobile cell node; and
communicatively connect with other mobile cell nodes and stationary cell nodes to establish a wireless connectivity between the UE and the wireless communication system,
wherein:
the mobile cell node automatically and dynamically assigns system parameters, autonomously and without depending on instructions or intelligence from network entities external to the mobile cell node, the system parameters comprising at least a physical cell identity (PCI) and root sequence index (RSI) for allowing the mobile cell node to maintain wireless connectivity with the system both while the mobile cell node is moving and while the mobile cell node is stationary,
the mobile cell node includes a location detection device or calculating means for detecting or calculating location coordinates of the mobile cell node,
wherein the PCI and the RSI of the mCell are automatically updated, autonomously and without involvement of a central server or operator, according to a mapping algorithm of the location coordinates if the mobile cell node moves; and
wherein the mobile carrier comprises at least one of a land transportation vehicle, a watercraft, an aircraft.

17. The system of claim 16, wherein the wireless communication system supports the integrated access and backhaul (IAB) protocol and the mobile cell node provides wireless access service, wireless relay, and wireless xHaul.

18. The system of claim 16, wherein system parameter assignment is automatic, autonomous, and dynamically adjusted upon the mobile cell node moving into the radio range of an active and connected node of the system.

19. The system of claim 16, wherein the mobile cell (mCell) is operable to be repositioned autonomously and dynamically to optimize the network.

* * * * *